(12) United States Patent
Tokita et al.

(10) Patent No.: US 8,311,671 B2
(45) Date of Patent: Nov. 13, 2012

(54) ROBOT FOR TRAINING A REHABILITATOR

(75) Inventors: Mamoru Tokita, Tokyo (JP); Koukichi Shimada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1265 days.

(21) Appl. No.: 12/078,294

(22) Filed: Mar. 28, 2008

(65) Prior Publication Data

US 2008/0288107 A1    Nov. 20, 2008

(30) Foreign Application Priority Data

May 14, 2007    (JP) ................................ 2007-128009

(51) Int. Cl.
*G06F 19/00* (2011.01)
*G05B 19/418* (2006.01)

(52) U.S. Cl. ............ 700/245; 701/1; 701/247; 701/260; 701/264

(58) Field of Classification Search .................. 700/245, 700/247, 260, 264; 901/4, 9, 15, 30; 318/568.1, 318/568.11, 568.16, 568.22, 628; 345/163, 345/179, 184; 414/4, 730; 56/15.8; 600/587; 601/35

See application file for complete search history.

(56) References Cited

U.S. PATENT DOCUMENTS

| | | | |
|---|---|---|---|
| 5,662,693 A * | 9/1997 | Johnson et al. ................. 607/49 |
| 5,800,366 A * | 9/1998 | Bertrand ......................... 601/24 |
| 5,899,869 A * | 5/1999 | Barrack et al. .................. 602/16 |
| 5,901,581 A * | 5/1999 | Chen et al. ....................... 601/34 |
| 6,325,770 B1 * | 12/2001 | Beny et al. ....................... 601/34 |
| 6,365,981 B1 * | 4/2002 | Tokita ............................. 290/1 R |
| 6,824,569 B2 * | 11/2004 | Okediji ............................ 623/30 |
| 7,090,650 B2 * | 8/2006 | Ou et al. ............................ 601/5 |
| 7,444,866 B2 * | 11/2008 | Tokita ......................... 73/379.01 |
| 2003/0139783 A1 * | 7/2003 | Kilgore et al. ................. 607/49 |
| 2004/0127821 A1 * | 7/2004 | Ou et al. ............................ 601/5 |
| 2005/0043661 A1 * | 2/2005 | Nashner .......................... 602/26 |
| 2006/0004307 A1 * | 1/2006 | Horst ................................ 601/5 |
| 2006/0052731 A1 * | 3/2006 | Shimada et al. .................. 602/5 |
| 2006/0052732 A1 * | 3/2006 | Shimada et al. .................. 602/5 |
| 2006/0142680 A1 * | 6/2006 | Iarocci ............................ 602/16 |
| 2006/0229170 A1 * | 10/2006 | Ozawa et al. ................... 482/92 |
| 2006/0241539 A1 * | 10/2006 | Agrawal et al. ................ 602/23 |
| 2007/0055189 A1 * | 3/2007 | Katoh et al. .................... 602/16 |
| 2007/0282228 A1 * | 12/2007 | Einav et al. ..................... 601/33 |
| 2008/0041153 A1 * | 2/2008 | Tokita ......................... 73/379.01 |
| 2010/0050765 A1 * | 3/2010 | Kadota et al. .............. 73/379.01 |

FOREIGN PATENT DOCUMENTS

JP         2006-204832        8/2006

* cited by examiner

*Primary Examiner* — Ian Jen
(74) *Attorney, Agent, or Firm* — Rabin & Berdo, P.C.

(57) ABSTRACT

In a robot for training a rehabilitator, the driving of actuators is controlled to generate the forces acting in six directions at the distal end of a bi-articular arm device to reproduce the relationship between the muscular output of the upper or lower limb of the human body and the output direction at the distal end of the limb. The rehabilitator can experience the relationship between the outputs of his or her limb muscles and the output direction at the distal end of the limb. Thus, the six actuators are run in operation along a predetermined sequence. One or more of the actuators, selected so that the direction of the force generated at the distal end of the first link will be the selected direction, is run in operation. The rehabilitator holding the distal end of the first link may physically experience the direction of that force.

5 Claims, 25 Drawing Sheets

ROBOT FOR TRAINING A REHABILITATOR

BACKGROUND OF THE INVENTION

1. Field of the Invention

The present invention relates to a robot or machine for training a rehabilitator.

2. Description of the Background Art

There has been proposed a robot or machine for training a rehabilitator, such as a physical therapist involved in rehabilitation, e.g. resistance training for restoring physical functions of aged persons or persons rallied from their illness or injury. See, for example, Japanese patent laid-open publication No. 2006-204832.

In the conventional robot for training a rehabilitator, however, the muscular output of hip and knee joints is simulated solely by the torques at the respective joints. The conventional robot thus cannot accurately define the characteristics of, e.g. three paired muscles, totaling at six muscles, with the result that a trainer in rehabilitation exercise, or a rehabilitator, is unable to properly experience the output of each muscle.

SUMMARY OF THE INVENTION

It is an object of the present invention to provide a robot for training a rehabilitator in which the relationship between the muscular output of the upper or lower limb of the human body and the force outputting direction at the distal end of the upper or lower limb may be reproduced to enable a rehabilitant to experience the above relationship.

In accordance with the present invention, the actuator driving is controlled so as to generate the forces acting in six directions at the distal end of a bi-articular arm device. More specifically, a robot for training a rehabilitator comprises a bi-articular arm device, which includes a first link, a second link having a proximal end rotatably supported in a base and having a distal end rotatably connected to a proximal end of the first link, a first actuator and a second actuator for generating the driving force for causing the first link to rotate relative to the second link, a third actuator and a fourth actuator for generating the driving force for causing the first link to rotate relative to the base, and a fifth actuator and a sixth actuator for generating the driving force for causing the second link to rotate relative to the base. The robot for further comprises a controller for actuating the first to sixth actuators in accordance with a predetermined driving sequence to generate the force in six directions at the distal end of the first link. One or more of the first to sixth actuators, selected so that the direction of the force to be generated at the distal end of the first link will be the selected direction, is run in operation to permit the rehabilitator, holding the distal end of the first link, to experience the direction of the force generated at the distal end of the first link.

In an aspect of the robot for training a rehabilitator, according to the present invention, an initial state is set so that driving forces generated by actuators arranged in antagonistic position relationships will be in equilibrium with one another. One or more of the actuators, which will generate the force of reaction when the rehabilitator has caused movement of the distal end of the first link in an optional direction, is detected, and one or more muscles associated with the actuator or actuators is specified and notified to the rehabilitator.

In accordance with the present invention, a robot for training a rehabilitator comprises a bi-articular arm device, which includes a first link, a second link having a proximal end rotatably supported in a base and having a distal end rotatably connected to a proximal end of the first link, and first and second actuators for generating driving forces for causing the first and second links to rotate independently of each other. The robot further comprises a controller including an algorithm for converting a driving sequence by six actuators, inclusive of the first and second actuators, into another driving sequence by the first and second actuators. The controller allows the force to be generated in six directions at the distal end of the first link. One or more of the first to sixth actuators, selected so that the direction of the force to be generated at the distal end of the first link will be the selected direction, is run in operation to permit the rehabilitator holding the distal end of the first link to physically experience the direction of the force generated at the distal end of the first link.

With a further aspect of a robot for training a rehabilitator, according to the present invention, the first and second actuators are controlled so that the torque acting on the first and second actuators when the rehabilitator has exerted the force on the distal end of the first link in an optional direction will be coincident with a predetermined target value. The direction of the force acting on the distal end of the first link is calculated from the rotational angles of the first and second actuators and the value of the torque when the torque coincides with the target value. The muscle or muscles of the upper or lower limb, the force has been applied to, is specified, based on the direction of the force calculated. The rehabilitator is advised of the muscle or muscles specified.

A further aspect of a robot for training a rehabilitator according to the present invention comprises a spring element for a bi-articular muscle interconnecting the first and second joints, as an inner model. The rotational angles of the first and second actuators when the rehabilitator has exerted the force to the distal end of the first link in an optional direction are detected. The rotational angles are converted into torques acting on the first and second actuators based on the inner model. The driving voltage or the driving current necessary to generate the torques is applied to the first and second actuators to virtually reproduce the torques by the spring element of the bi-articular muscle to permit the rehabilitator to physically experience the torques.

With a still further aspect of a robot for training a rehabilitator according to the present invention, the bi-articular arm device includes a skin unit covering up the surfaces of the first and second links and a light emitting unit arranged at a location matched to a mono-articular muscle or a bi-articular muscle of an upper limb or a lower limb. The light emitting unit associated with an actuator generating the driving force or with an actuator subjected to the force is turned on to permit the rehabilitator to visually recognize the muscle of the upper limb or the lower limb activated or the upper limb or the lower limb subjected to the force.

According to the present invention, the driving of the actuators may be controlled to generate forces in six directions at the distal end of the bi-articular arm device. In this manner, the relationship between the muscular output of the upper or lower limb of the human body and the output direction at the distal end of the upper or lower limb may be reproduced. The rehabilitator is able to experience the relationship between the muscular output of the upper or lower limb of the human body and the output direction at the distal end of the upper or lower limb.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
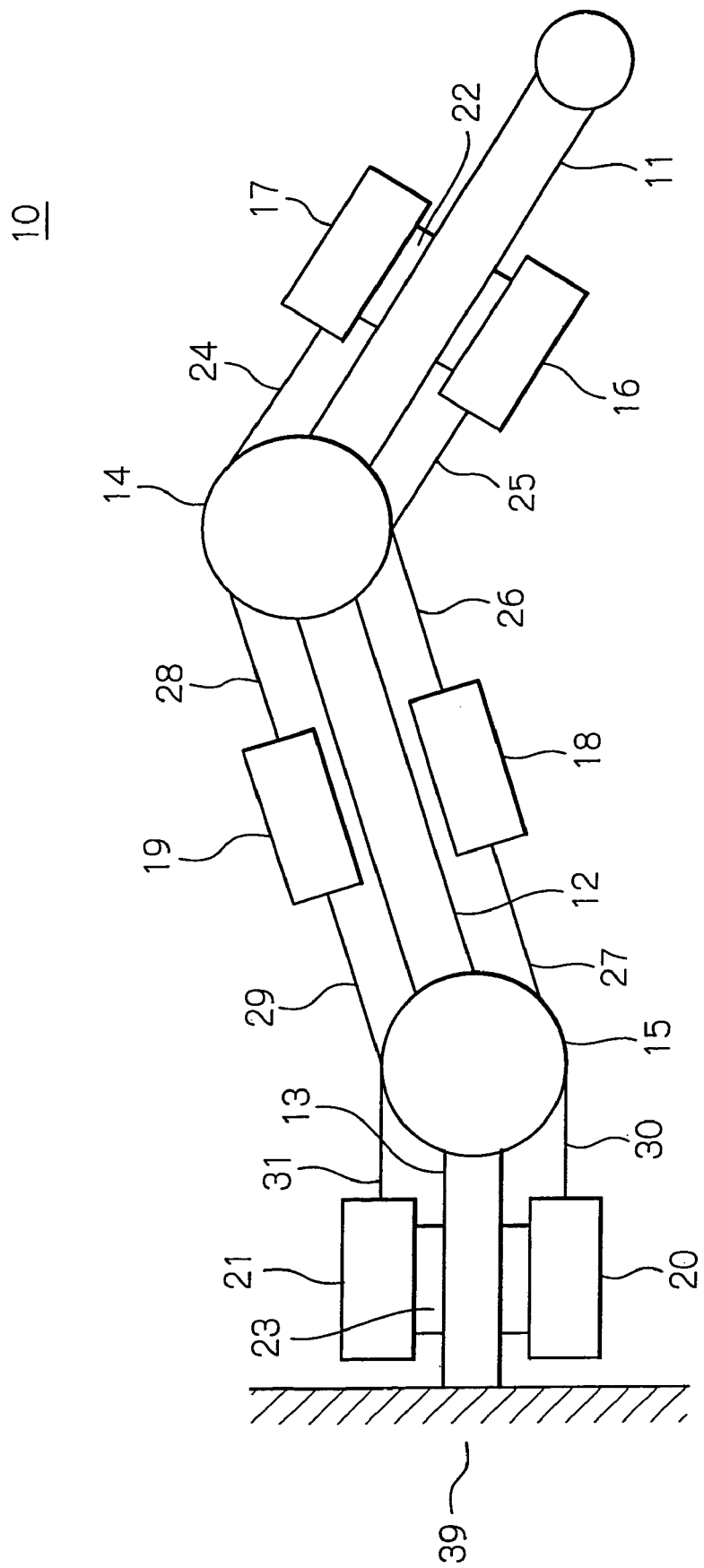
FIG. 1 schematically shows the constitution of a bi-articular arm device according to a first embodiment of the present invention.
Figure 2:
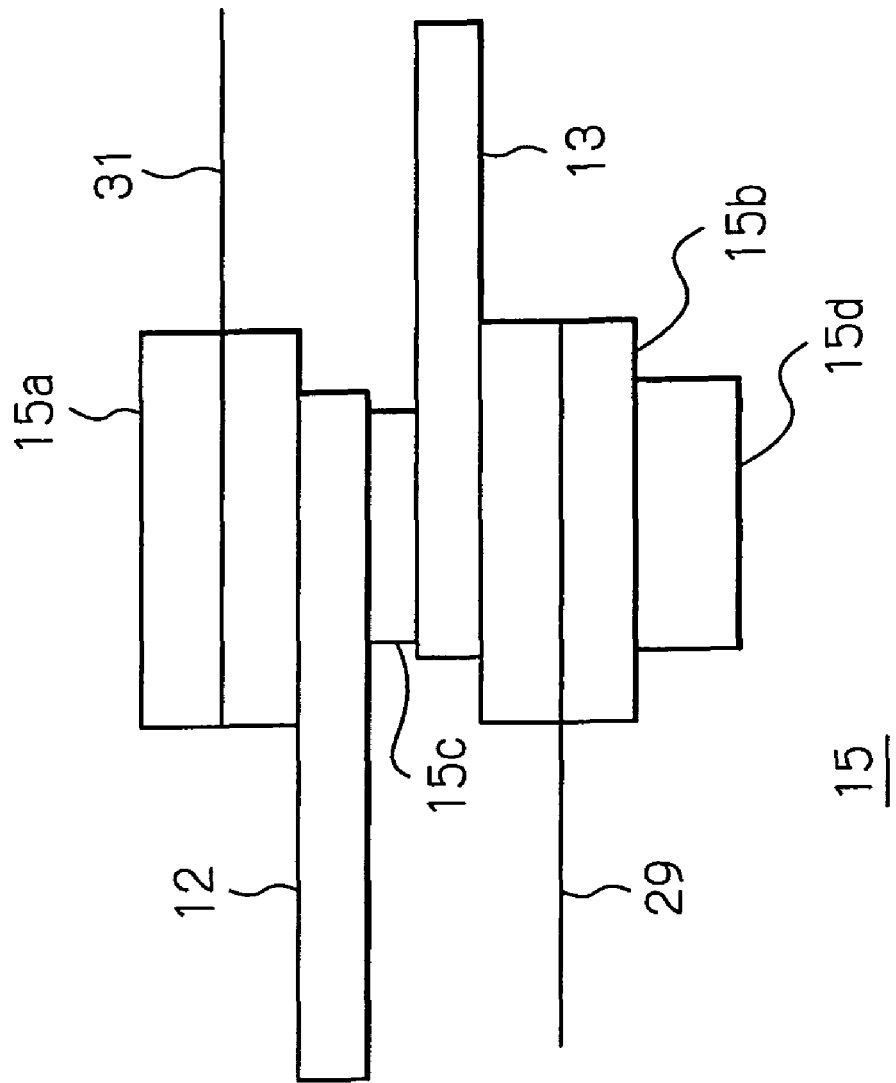
FIG. 2 is a schematic side view showing the second joint section of the first embodiment shown in FIG. 1.
Figure 3:
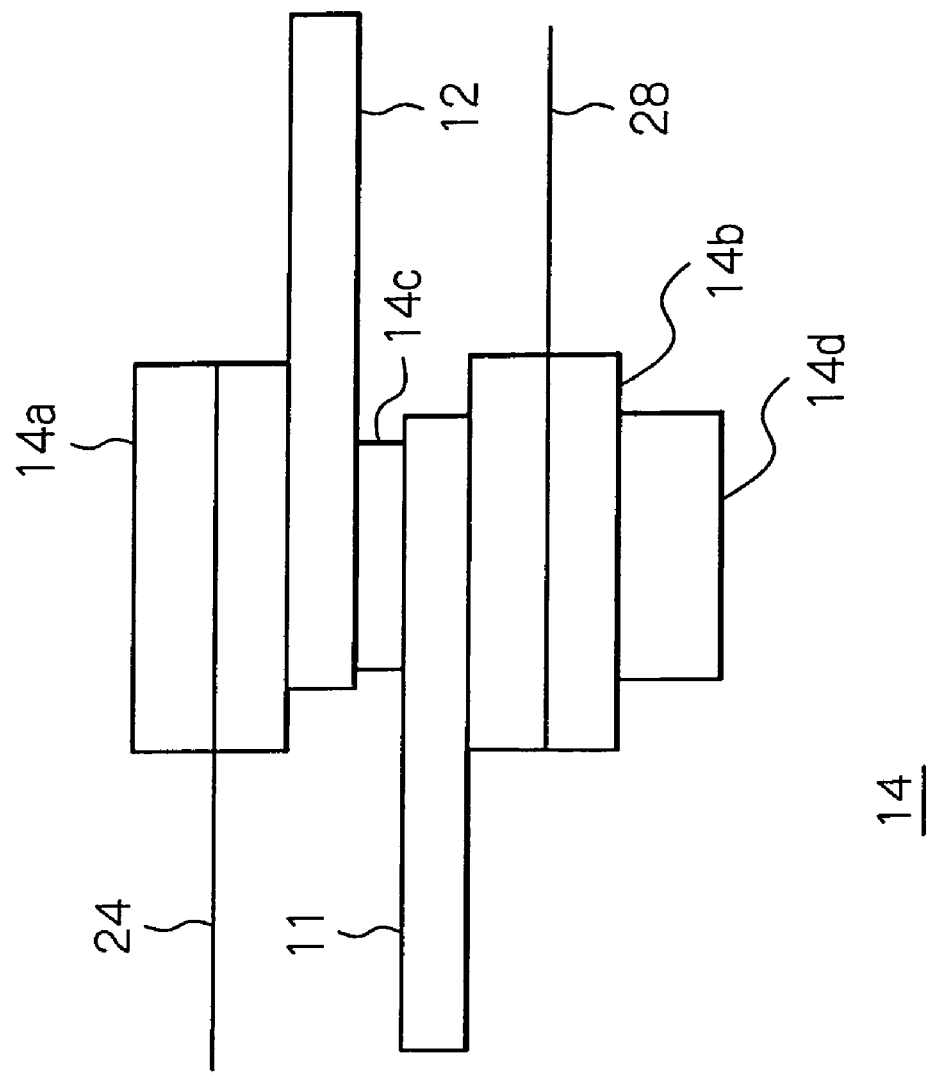
FIG. 3 is a schematic side view showing the first joint section of the first embodiment.

With reference to the accompanying drawings, preferred embodiments of the present invention will be described in detail. FIG. 1 shows the constitution of a bi-articular arm device according to a first illustrative embodiment of the present invention. FIG. 2 is a schematic side view showing the second joint section of the first embodiment, and FIG. 3 is a schematic side view showing the first joint section of the first embodiment.

In FIG. 1, a bi-articular arm device 10 is included in a robot for training a trainer in rehabilitation exercise, or a rehabilitator, according to the first embodiment, and has a structure simulating the lower limb, that is, a leg, of the human body. The bi-articular arm device 10 may alternatively be of a structure that simulates the upper limb, that is, an arm, of the human body. The following description will, however, focus on the bi-articular arm device 10 having its structure simulating the lower limb of the human body.

The bi-articular arm device 10 has a first link 11 that simulates the lower limb is for the lower leg, and a second link 12 that simulates the lower limb is for the upper leg or thigh. A frame 13, as a base, is for the waist part, and has a proximal part (left-hand end in FIG. 1) secured to a stationary member 39, secured in turn to, for example, a foundation, not shown. To the distal end (right-hand end in FIG. 1) of the frame 13 is rotatabley connected the proximal end of the second link 12 via the second joint section 15 which is for the hip joint. To the distal end of the second link 12 is rotatably connected the root end of the first link 11, via the first joint section 14, which is for the knee joint.

The reference numerals 16 to 21 denote first to sixth actuators, respectively. The reference numeral 22 denotes a first bracket for securing the first actuator 16 and the second actuator 17 to the first link 11. The reference numeral 23 denotes a second bracket for securing the fifth actuator 20 and the sixth actuator 21 to the frame 13.

The reference numerals 24 to 31 denote wires. The wire 24 interconnects the second actuator 17 and a knee pulley 14a mounted on the second link. The wire 25 interconnects the first actuator 16 and the knee pulley 14a mounted on the second link. The wire 26 interconnects the third actuator 18 and a knee pulley 14b mounted on the first link. The wire 27 interconnects the third actuator 18 and the hip pulley 15b mounted on the frame. The wire 28 interconnects the fourth actuator 19 and the knee pulley 14b mounted on the first link. The wire 29 interconnects the fourth actuator 19 and a hip pulley 15b mounted on the frame. The wire 30 interconnects the fifth actuator 20 and the hip pulley 15a mounted on the second link. The wire 31 interconnects the sixth actuator 21 and the hip pulley 15a mounted on the second link.

The first and second actuators 16 and 17 generate the driving force for causing rotation of the first link 11, whereas the third and fourth actuators 18 and 19 generate the driving force for causing rotation of the second link 12 independently of rotation of the first link 11. The fifth and sixth actuators 20 and 21 generate the driving force for causing rotation of the first and second links 11 and 12 simultaneously with respect to the frame 13.

The second joint section 15 include the hip pulley 15a mounted on the second link and the hip pulley 15b mounted on the frame, as shown in FIG. 2. The hip pulley 15a is mounted on the second link 12 so as not to perform relative rotation thereto, whereas the hip pulley 15b is mounted on the frame 13 so as not to perform relative rotation thereto. The second link 12 and the frame 13 are interconnected by a bush 15c so as to be rotated relative to each other. An encoder 15d measures the angle the frame 13 makes with the second link 12. The wires 31 and 30 are wrapped around the hip pulley 15a, mounted on the second link, and have terminal ends mounted on the hip pulley 15a, in turn mounted on the second link. Similarly, the wires 29 and 27 are wrapped around the hip pulley 15b, mounted on the frame, and have terminal ends mounted on the hip pulley 15b, in turn mounted on the frame.

The first joint section 14 includes the knee pulley 14a mounted on the second link and the knee pulley 14b mounted on the first link, as shown in FIG. 3. The knee pulley 14a is mounted on the second link 12 so as not to perform relative rotation thereto, whereas the knee pulley 14b is mounted on the first link 11 so as not to perform relative rotation thereto. The first and second links 11 and 12 are interconnected by a bush 14c so that both links will be rotated relative to each other. An encoder 14d measures the angle the first link 11 makes with the second link 12. The wires 24 and 25 are wrapped around the knee pulley 14a mounted on the second link and have terminal ends mounted on the knee pulley 14a mounted on the second link. Similarly, the wires 28 and 26 are wrapped around the knee pulley 14b, mounted on the first link, and have terminal ends mounted on the knee pulley 14b, in turn mounted on the first link.

Figure 4:
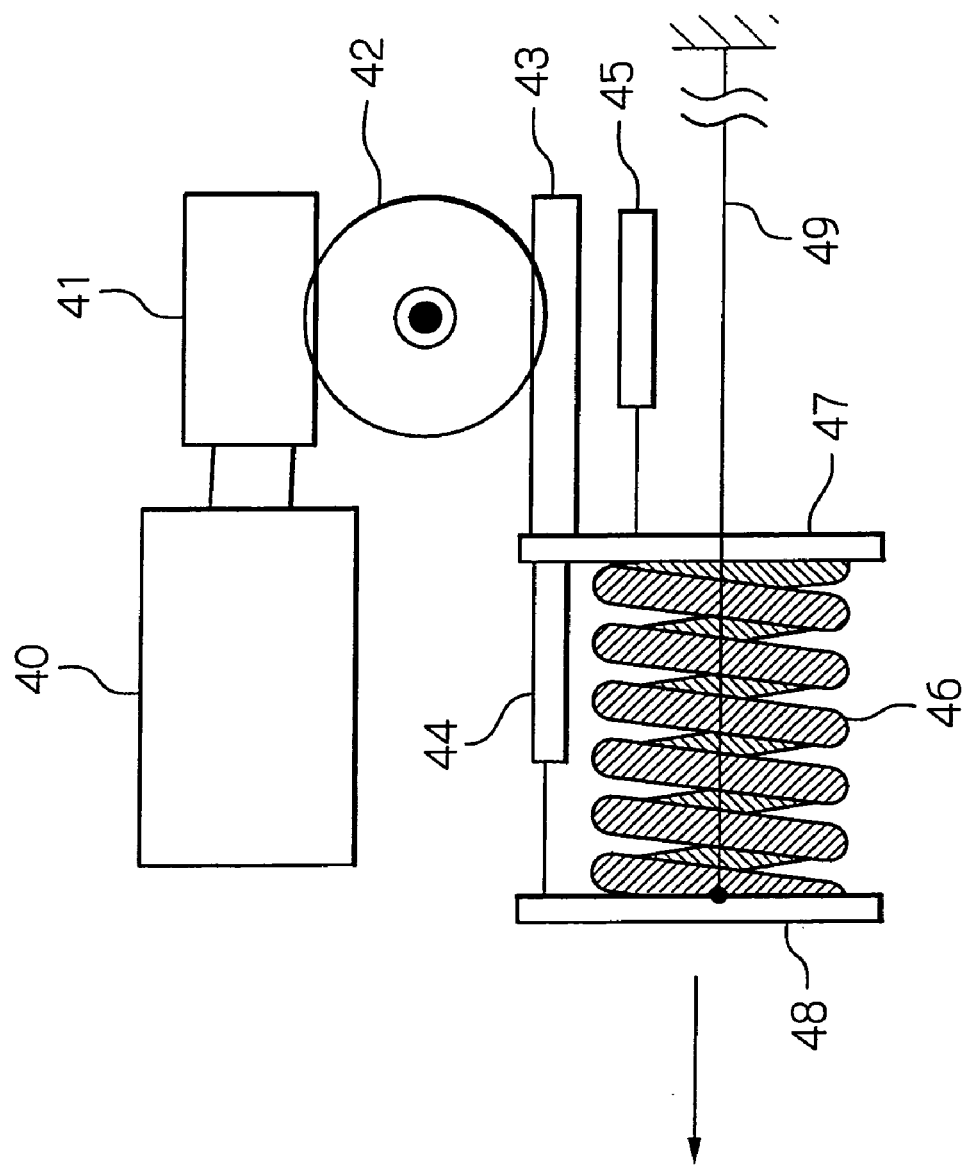
FIG. 4 schematically shows the constitution of an actuator according to the first embodiment.
Figure 5:
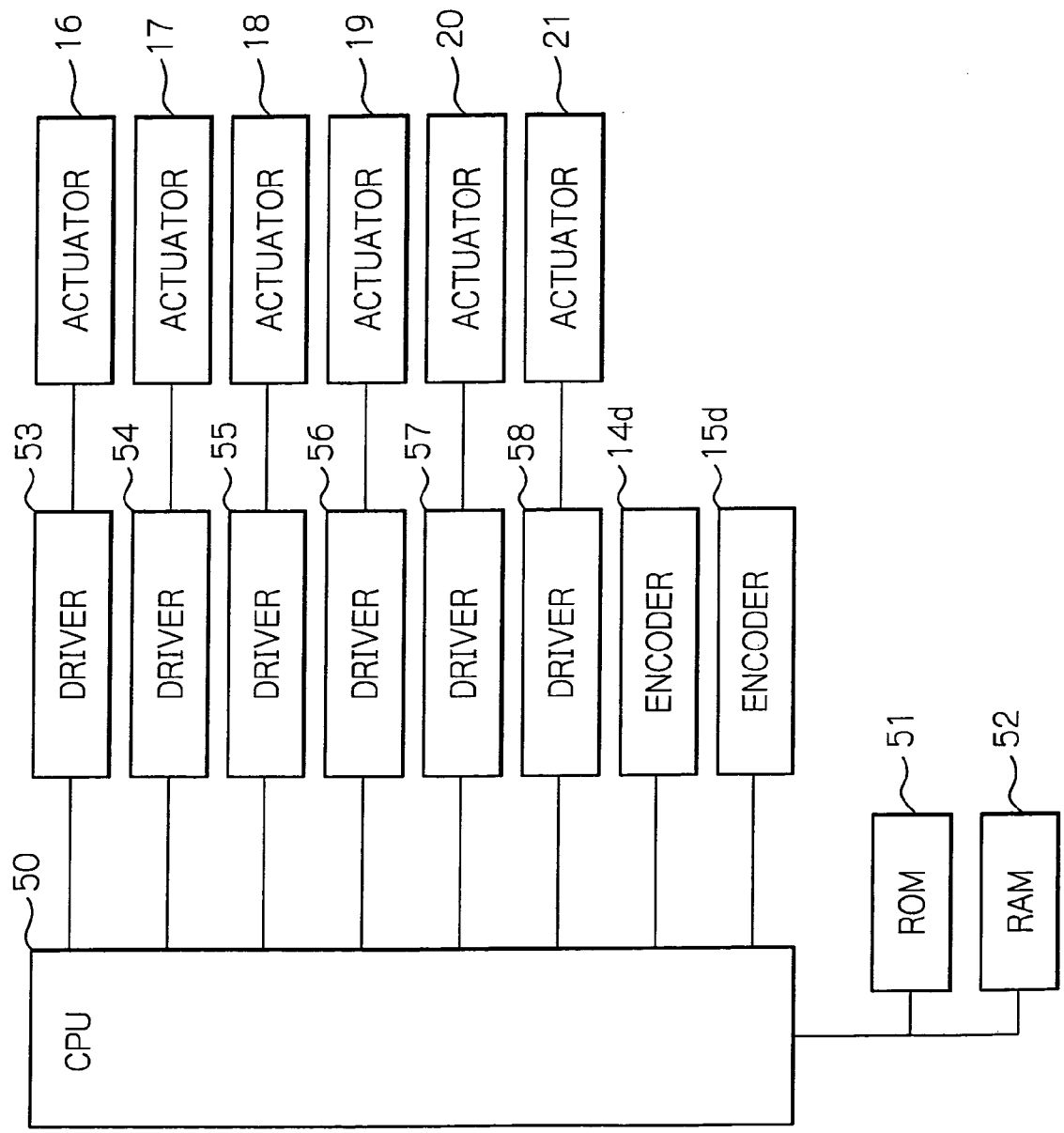
FIG. 5 is a schematic block diagram showing a controller for controlling the bi-articular arm device according to the first embodiment.

The constitution of the first to sixth actuators 16 to 21 will now be described. FIG. 4 shows the constitution of the actuator according to the first embodiment. FIG. 5 is a block diagram showing a controller for controlling the operation of a bi-articular arm device according to the first embodiment.

In the present embodiment, the first to sixth actuators 16 to 21 are each of substantially the same constitution. Each actuator includes a motor 40, a worm 41, a helical gear 42, a rack 43, a first potentiometer 44, a second potentiometer 45, a spring 46, a first bracket 47, a second bracket 48 and a wire 49, as shown in FIG. 4. The wire 49 depicted is a wire end of any one of the wires 24 to 31, and is secured to the first bracket 47. The wires 24 to 31 have the opposite ends thereof mounted on the knee pulley 14a, knee pulley 14b, hip pulley 15a and on the hip pulley 15b. In the first actuator 16 and in the second actuator 17, the motor 40 is secured to a first bracket 22, whereas, in the fifth actuator 20 and in the sixth actuator 21, the motor 40 is secured to the second bracket 23. In the third actuator 18 and in the fourth actuator 19, the motor 40 is mounted on the hip pulley 15a and on the hip pulley 15b.

The spring 46 may be formed of a material other than metal, such as synthetic resin, provided that the material used is elastic. In an example shown in FIG. 4, the spring 46 is a coil spring, the axis of which extends normal to the surface of the second bracket 48 and to the surface of the first bracket 47 secured to the rack 43. Translational movement of the rack 43 causes the position of the spring 46 to be changed.

The rack 43 is mounted for sliding in the left and right direction in FIG. 4, along a guide member secured to a stationary member, not shown. Meanwhile, the teeth of the rack 43 are formed on its surface facing the helical gear 42, that is, on its upper surface in FIG. 4.

The helical gear 42 is mounted on an axle secured to the stationary member, not shown. The helical gear 42 meshes with the rack 43 at its lower part in FIG. 4, while meshing with the worm 41 at its upper part in FIG. 4. In this case, the helical gear 42 operates as a worm wheel and is rotated by the worm 41 about its axle of rotation.

The worm 41 is mounted for rotation on the rotating axle of the motor 40. Meanwhile, the axle of the motor 40 and the worm 41 are rotated about an axis extending in the left and right direction in FIG. 4. Thus, when the worm 41 is rotated by the motor 40, the helical gear 42, meshing with the worm 41, is rotated, and hence the rack 43, meshing with the helical gear 42, is moved in the left and right direction in FIG. 4.

The motor 40 is secured to the stationary member, not shown, and is driven by the driving current from drivers 53 to 58, shown in FIG. 5, to cause rotation of the axle thereof in a predetermined direction at a predetermined speed. Although the motor 40 is here a d.c. motor, by way of example, it may also be of any other type.

The controller for controlling the operation of the bi-articular arm device 10 is configured as shown in FIG. 5. In this figure, a read-only memory (ROM) 51, in which is stored program sequences, to be run on the central processor unit (CPU) 50 serving as computing or processing means, and a random-access memory (RAM) 52, are connected to the central processor unit 50. The random access memory 52 is used to temporarily store data when the program is run on the central processor unit 50. The drivers 53 to 58 cause the operation of the first to sixth actuators 16 to 21 in response to instructions from the central processor unit 50. To the central processor unit 50 are also connected an encoder 14d for measuring the angle of rotation of the first link 11 relative to the second link 12, and another encoder 15d for measuring the angle of rotation of the frame 13 relative to the second link 12.

The central processor unit 50 is connected for communication to a higher-order device, not shown, over a network, for instance. The higher-order device may be enumerated by computing means, such as CPU or MPU (Micro Processor Unit), storage means, such as a magnetic disc or a semiconductor memory, inputting means, such as keyboard, mouse or pointing device, display means, such as cathode-ray tube (CRT), liquid crystal display or electro-luminescence display, and telecommunications means, for instance. The central processor unit comprehensively controls the operation of the bi-articular arm device 10. The central processor unit 50 transmits control signals to the drivers 53 to 58 to drive the motors 40, in accordance with the stored program or with instructions by an operator supplied over the inputting means.

For example, if the central processor unit 50 transmits instructions to the first to sixth actuators 16 to 21 for generating an output in the contracting direction, the motor 40 is actuated to cause rotation of the axle of the motor 40 and the worm 41 in a predetermined direction. This causes rotation of the helical gear 42 meshing with the worm 41. Hence, the rack 43, meshing with the worm 41, is moved in a direction towards left in FIG. 4. The spring 46 is moved towards left and the first bracket 47 is also moved towards left.

Thus, the motor 40, worm 41, helical gear 42 and the rack 43 operate as means for controlling the position of one end of the spring 46 as an elastic member. On the other hand, the first bracket 47 operates as means for taking out the elastic force of the spring 46, that is, the spring force, at the opposite end of the spring 46, as an output of one of the first to sixth actuators 16 to 21. The drivers 53 to 58 operate as means for receiving instructions for generating the contractile force.

Figure 6:
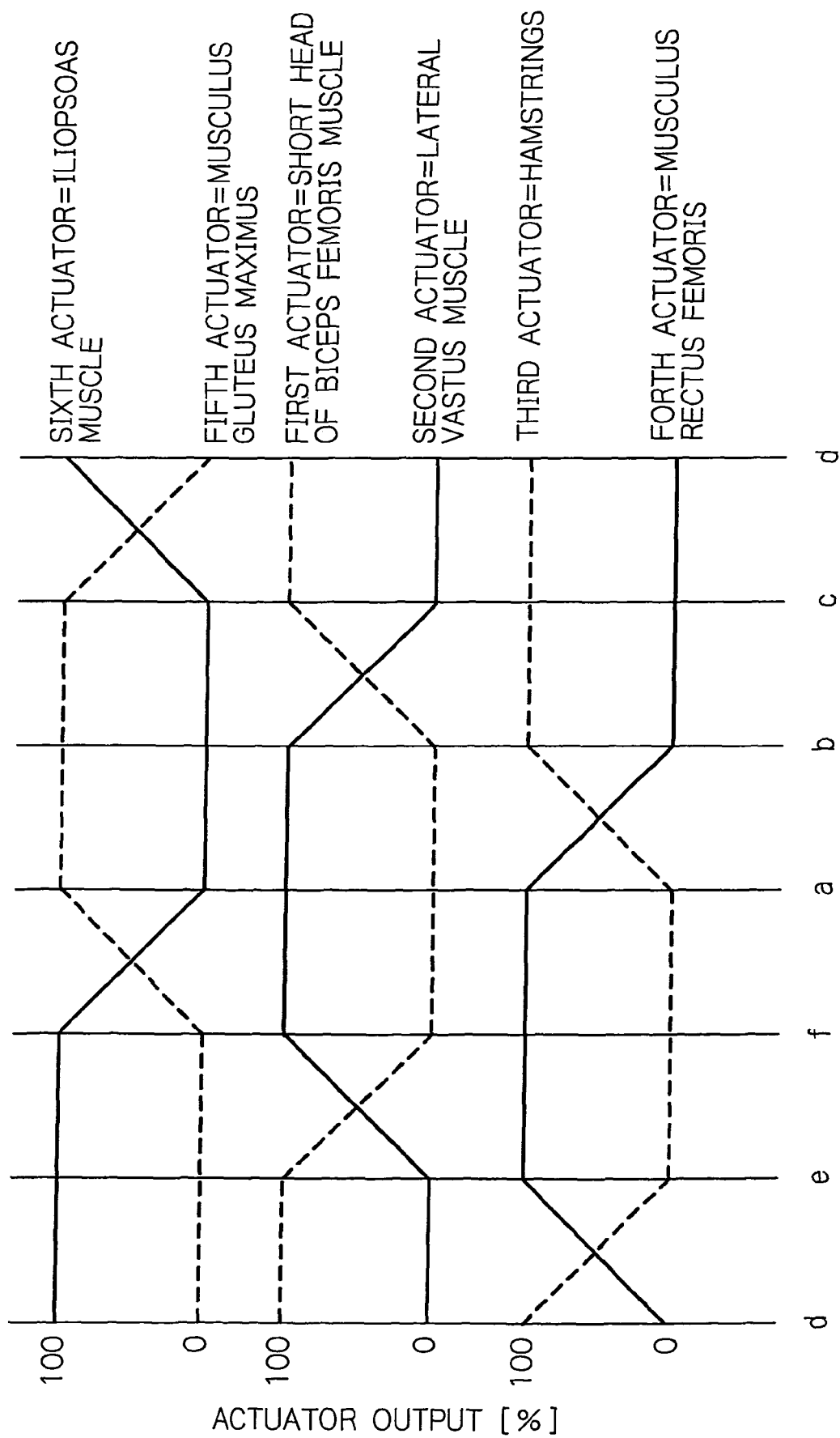
FIG. 6 shows a driving sequence of an actuator and the force directions according to the first embodiment.
Figure 7:
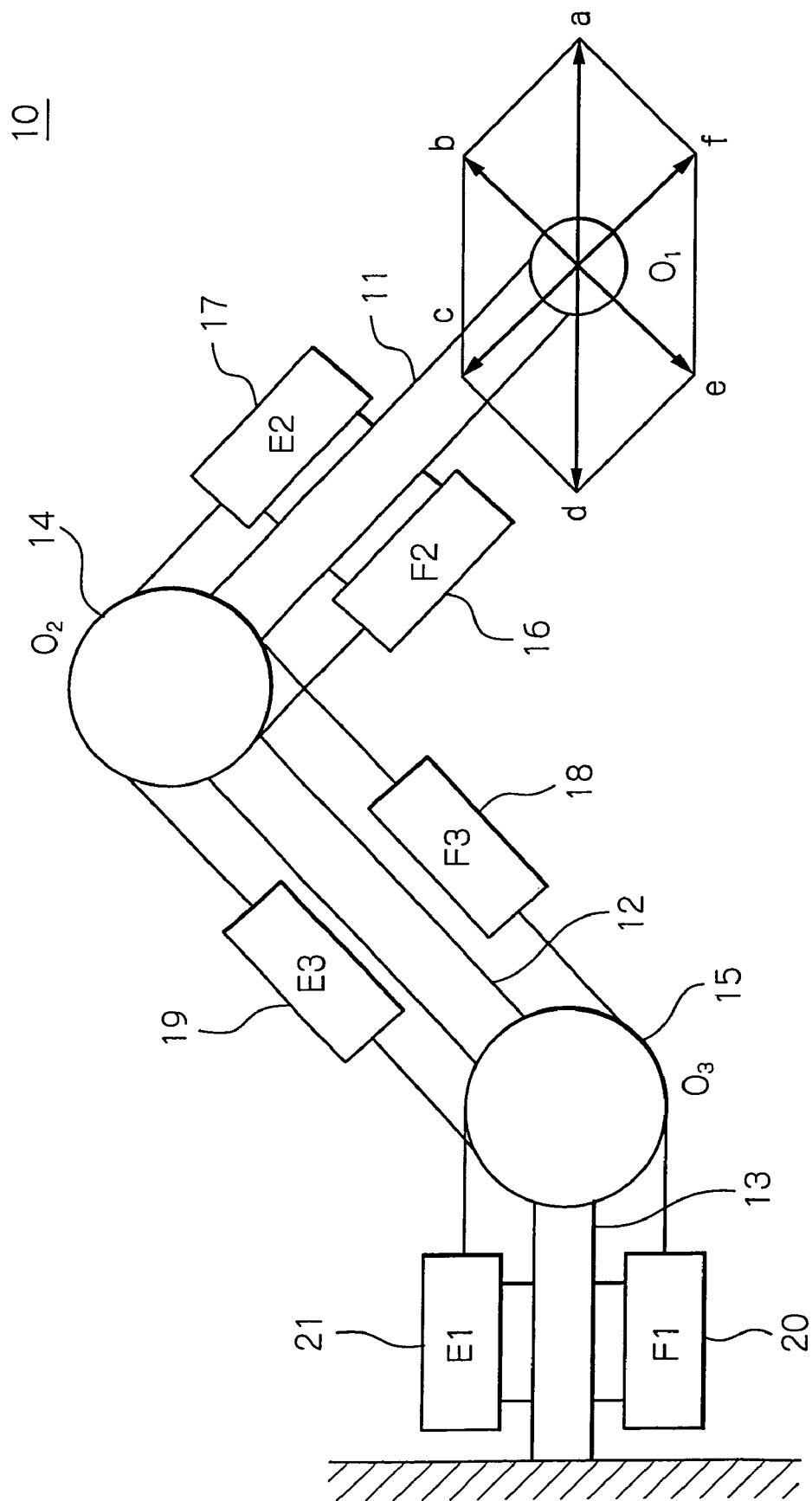
FIG. 7 schematically shows the directions of the forces generated at the distal end of the bi-articular arm device according to the first embodiment.
Figure 8:
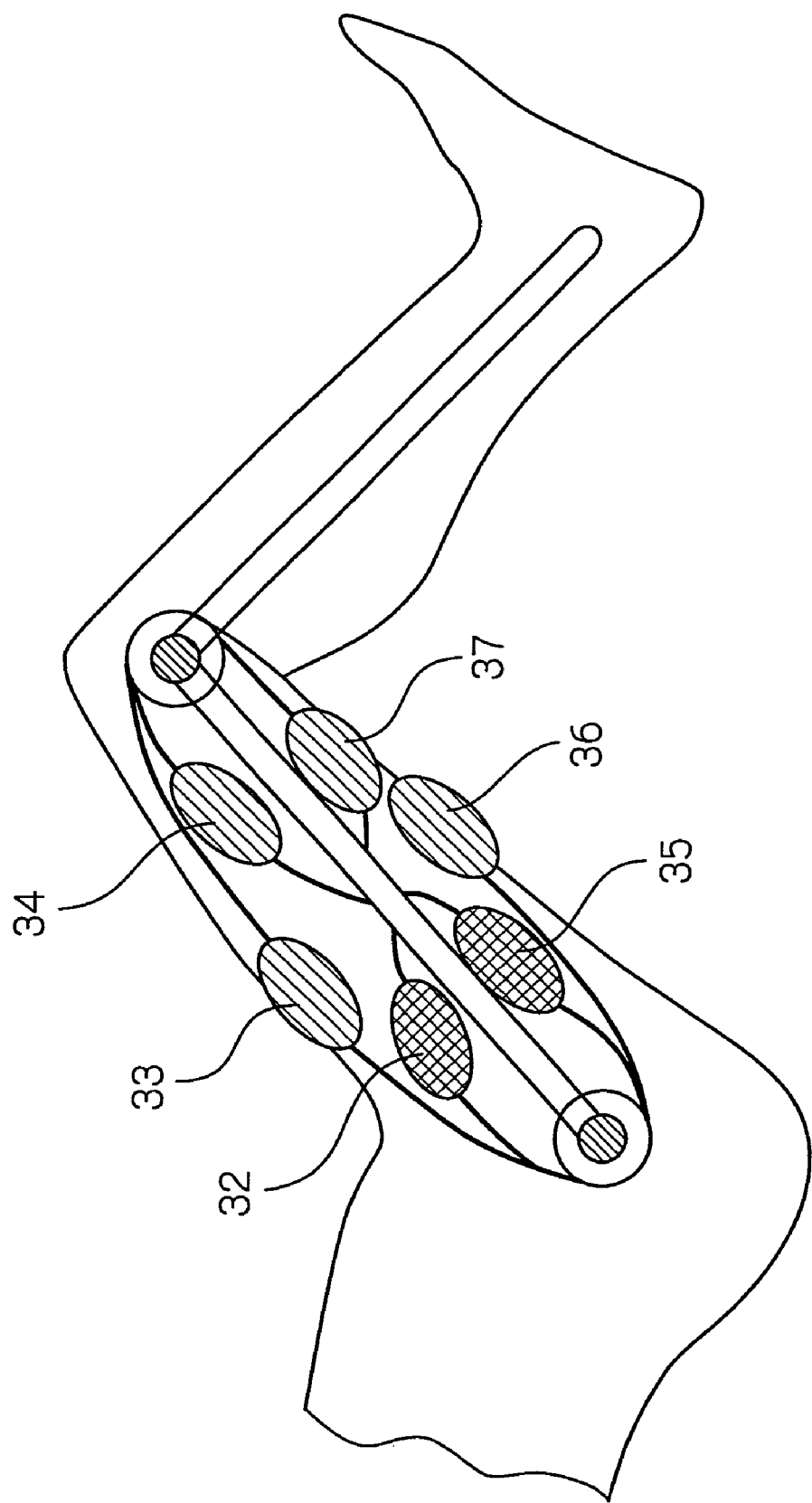
FIG. 8 schematically shows the structure of the lower limb simulated by the bi-articular arm device according to the first embodiment.

The operation of the above-described robot for training a rehabilitator will now be described. Initially, the operation of the bi-articular arm device 10 will be described. FIG. 6 shows the driving sequence and the force directions in an actuator of the first embodiment. FIG. 7 shows the directions of the forces generated at the distal end of the bi-articular arm device. FIG. 8 shows the structure of a lower limb of the human body, as simulated by the bi-articular arm device of the first embodiment. Meanwhile, the ordinate of FIG. 6 denotes an actuator output expressed in percent (%).

In FIG. 7, letters a to f denote the directions of the forces generated at the distal end of the first link 11. For example, if the force is to be generated in a direction a in FIG. 7, the outputs of the first to sixth actuators 16 to 21 are controlled as indicated by a driving sequence a in FIG. 6. Thus, the driving sequences a to f in FIG. 6 respectively correspond to the directions of the force generation a to f in FIG. 7. In this figure, $O_1$, $O_2$ and $O_3$ denote the center of the distal end, the center of the first joint section 14 and the center of the second joint section 15, respectively.

In the lower limb of the human body, shown in FIG. 8, the iliopsoas muscle 32 is associated with the sixth actuator 21, and the musculus rectus femoris 33 is associated with the fourth actuator 19. The lateral vastus muscle 34 is associated with the second actuator 17, and the musculus gluteus maximus 35 is associated with the fifth actuator 20. The hamstrings 36 are associated with the third actuator 18, and the short head of biceps femoris muscle 37 is associated with the first actuator 16. Meanwhile, FIG. 6 shows the relationship between the first to sixth actuators 16 to 21 and the above muscles of the lower limb.

It has been known that, if the output of the first actuator 16 is denoted by F2, then the output of the second actuator 17 is denoted by E2, the output of the third actuator 18 is denoted by F3, the output of the fourth actuator 19 is denoted by E3, the output of the fifth actuator 20 is denoted by F1, and the output of the sixth actuator 21 is denoted by E1, and the forces a to f are generated on driving the respective actuators in accordance with the driving sequences shown in FIG. 6, the generated forces are in a hexagonal shape, as shown in FIG. 7.

It has also been known that the length of a line segment ab or a line segment de is equal to the sum of F3 and E3, the length of a line segment bc or a line segment ef is equal to the sum of F2 and E2, and that the length of a line segment cd or a line segment af is equal to the sum of F1 and E1.

The outputs of the first to sixth actuators 16 to 21 will now be described. The wire 49 corresponding to the end towards the actuator of one of the wires 24 to 31 is secured to the first bracket 47, as shown in FIG. 4. The opposite ends of the wires 24 to 31 are secured to the knee pulley 14a mounted on the second link, to the knee pulley 14b mounted on the first link, to the hip pulley 15a mounted on the second link and to the hip pulley 15b mounted on the frame. In the first actuator 16 and in the second actuator 17, the motor 40 is secured to a first bracket 22, whereas, in the fifth actuator 20 and in the sixth actuator 21, the motor 40 is secured to the second bracket 23. In the third actuator 18 and in the fourth actuator 19, the motor 40 is mounted to the hip pulley 15a, mounted in turn on the second link, and is also mounted on the hip pulley 15b, in turn mounted on the frame.

The state in which the wire 49 is stretched without slack, and the tension of the wire 49 is zero, is labeled a zero actuator output state. The state in which, beginning from the zero actuator output state, the motor 40 is actuated, and continues its operation, until the second bracket 48 is moved to the maximum extent in a direction indicated by an arrow, with the tension on the wire 49 being then maximum, is labeled the 100[%] actuator output state.

Figure 9:
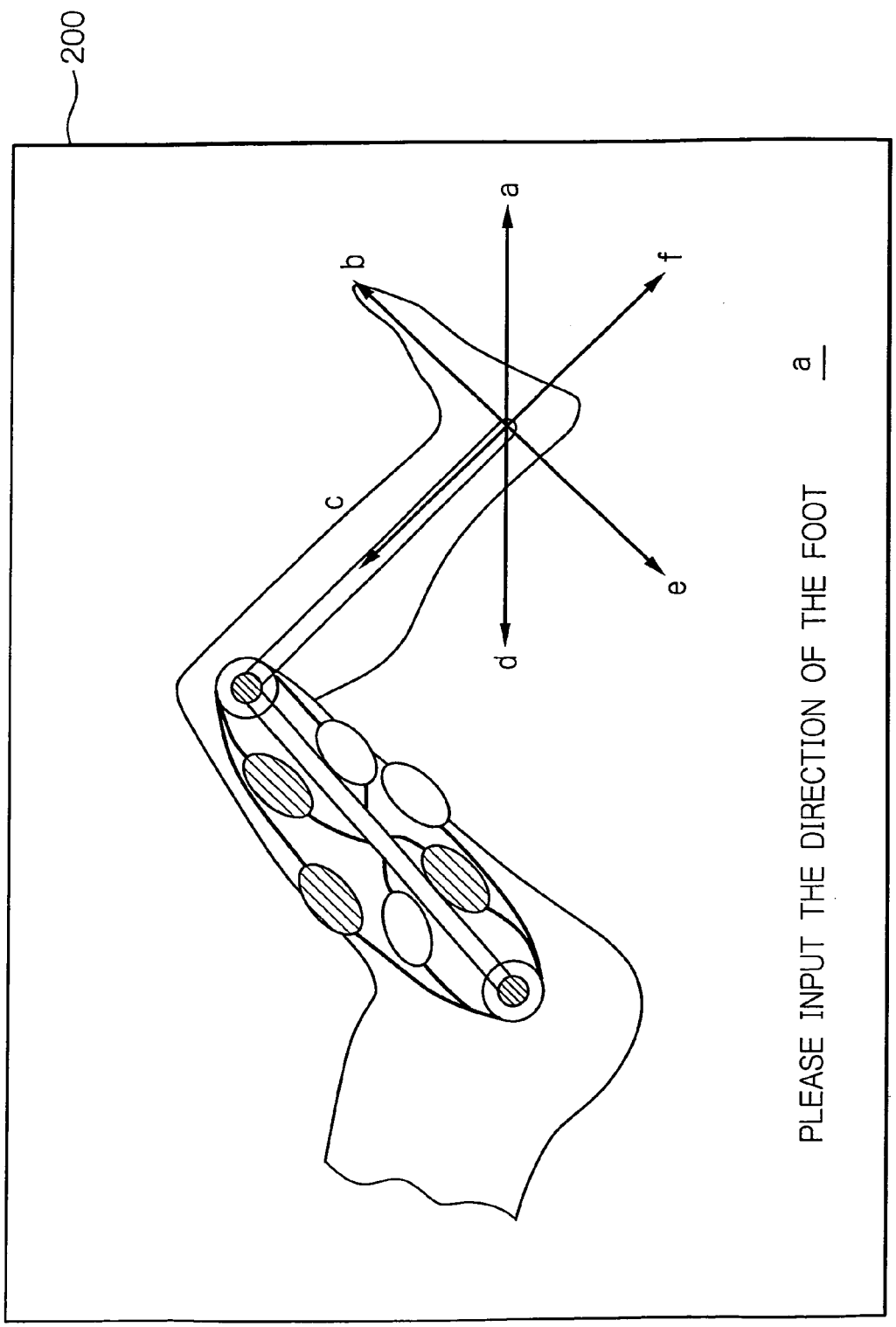
FIG. 9 schematically shows an example of a screen for selecting the output directions at the distal end of the lower limb according to the first embodiment.
Figure 10:
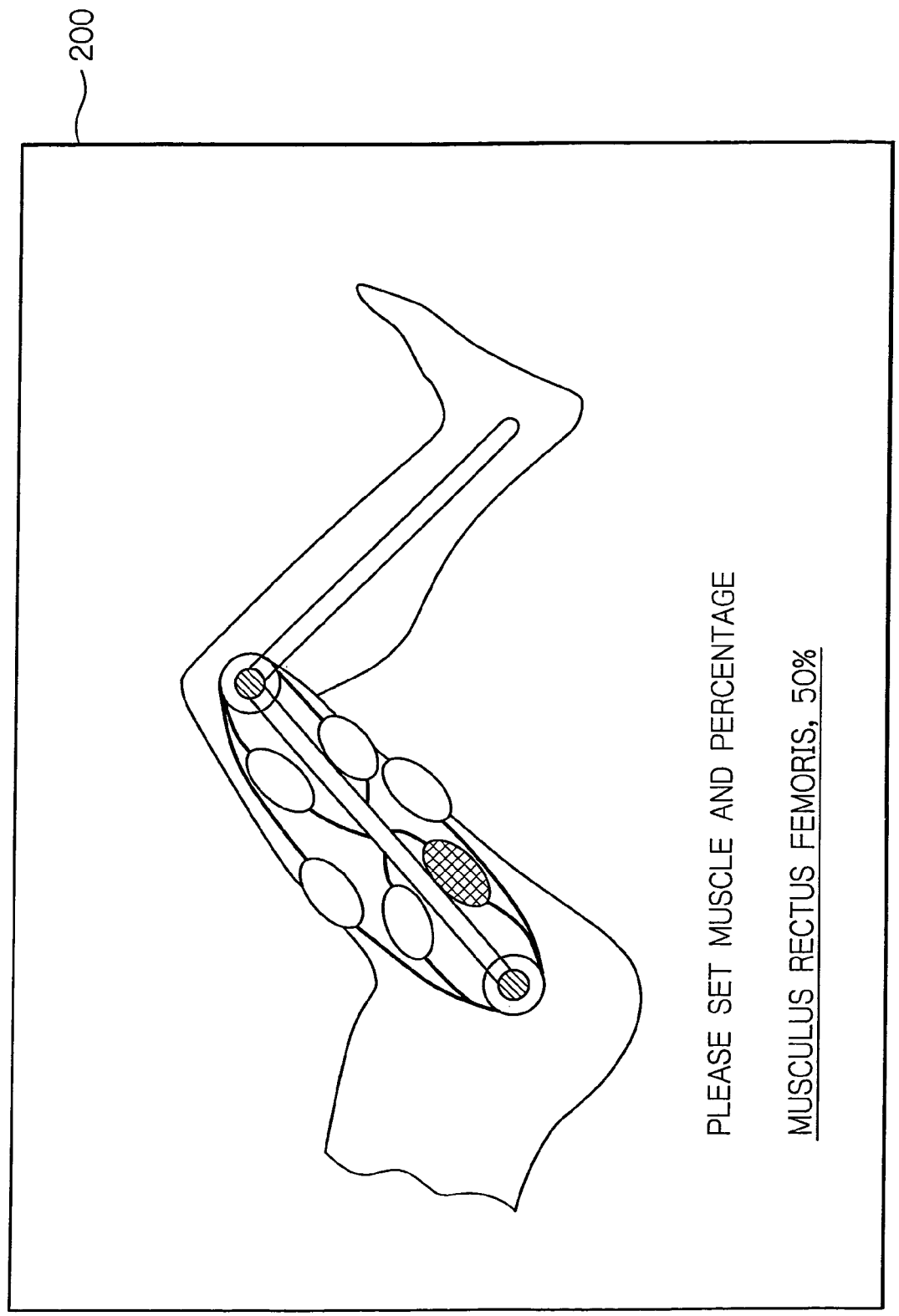
FIG. 10 schematically shows an example of a screen for setting the muscular force of the lower limb according to the first embodiment.

It will now be described how a trainer uses the robot for training a rehabilitator. In the context, such a rehabilitator may sometimes be called a trainee. However, some confusion could be involved as a trainee to be rehabilitated. In the following, therefore, the term "rehabilitator" is exclusively referred to in that context rather than trainee. FIG. 9 shows an example of a screen for selecting the output direction of the foot in the first embodiment. FIG. 10 shows an example of a screen for setting the muscular force of the lower limb in the first embodiment.

In these figures, the reference numeral 200 denotes a display, such as a liquid crystal display or a light emitting diode (LED) display. Although the display 200 may be part of display means of a higher-order device of the controller that controls the operation of the bi-articular arm device 10, it is assumed here that the display 200 is display means of an operation terminal connected to the controller or to the higher-order device.

First, the rehabilitator, i.e. trainee by this machine 10, inputs the output direction at the distal end of his or her lower limb on an input screen demonstrated on the display 200 of the operation terminal shown in FIG. 9. When the output direction has been input, the image of the muscle associated with the input direction, for example, the muscle needed for force application in a direction a, if the input direction of force exertion is the direction a, is changed in color on the screen, to permit the rehabilitator to recognize such muscle.

The rehabilitator then holds the vicinity of the center $O_1$ of the distal end of the bi-articular arm device 10 shown in FIG. 7, and acts on the operation terminal to advise the terminal that preparation has been finished. The inputting operation at this time may be by pressing down a return key of the keyboard at the operating terminal or by voice input taking advantage of the voice recognition function of the operation terminal. When the fact that preparation has been finished, the operation terminal transmits a command to the controller or to the higher-order device. The controller or the higher-order device then selects the actuator relating with the command received.

Since the direction a has been selected, the second actuator 17, the fourth actuator 19 and the fifth actuator 20 are selected in accordance with the sequence shown in FIG. 6. When the actuators 17, 19 and 20 are driven with the predetermined force, the distal end starts to be moved in the direction a. Since the rehabilitator holds the distal end, he or she may physically experience the direction of the force, that is, the direction a, and its magnitude.

Since the rehabilitator may preset the force, generated by each muscle, on the input screen, shown in FIG. 10, he or she may learn the direction as well as the magnitude of the force generated with variations in the muscular force.

The present device may also be used for ability tests for the rehabilitator if the above operations are carried out without the rehabilitator being informed of the directions of the force or of setting values of the respective muscles, with the rehabilitator then judging the direction or the magnitude of the force exerted and reporting the results.

Thus, in the present embodiment, the muscular structure of the upper or lower limb of the human body is built from the outset in the robot for training a rehabilitator. Hence, the output of each muscle of the upper or lower limb of the human body as well as the direction of the force at the distal end of the device may be reproduced. Thus, the rehabilitator may experience the force exerted by each muscle of the upper or lower limb as well as the direction of the force at the distal end of the device.

An alternative, second embodiment of the present invention will now be described. The parts or components which may be the same as the first embodiment are depicted by the same reference numerals and a repetitive description thereof will be dispensed with. A repetitive description of the operation or advantages similar to that of the first embodiment will also be dispensed with.

Figure 11:
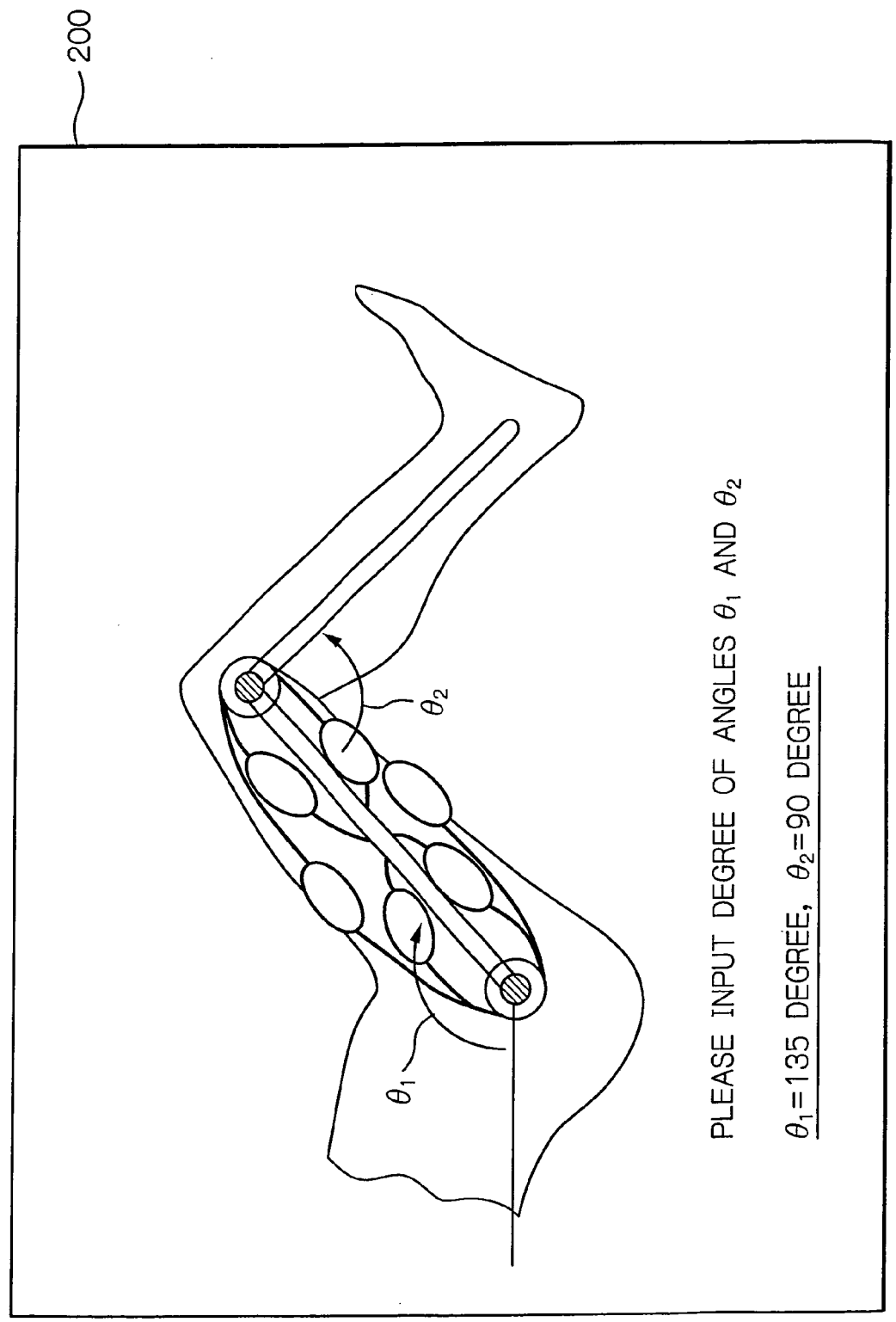
FIG. 11 schematically shows an example of a screen for setting the position of the lower limb according to an alternative, or second, embodiment of the present invention.
Figure 12:
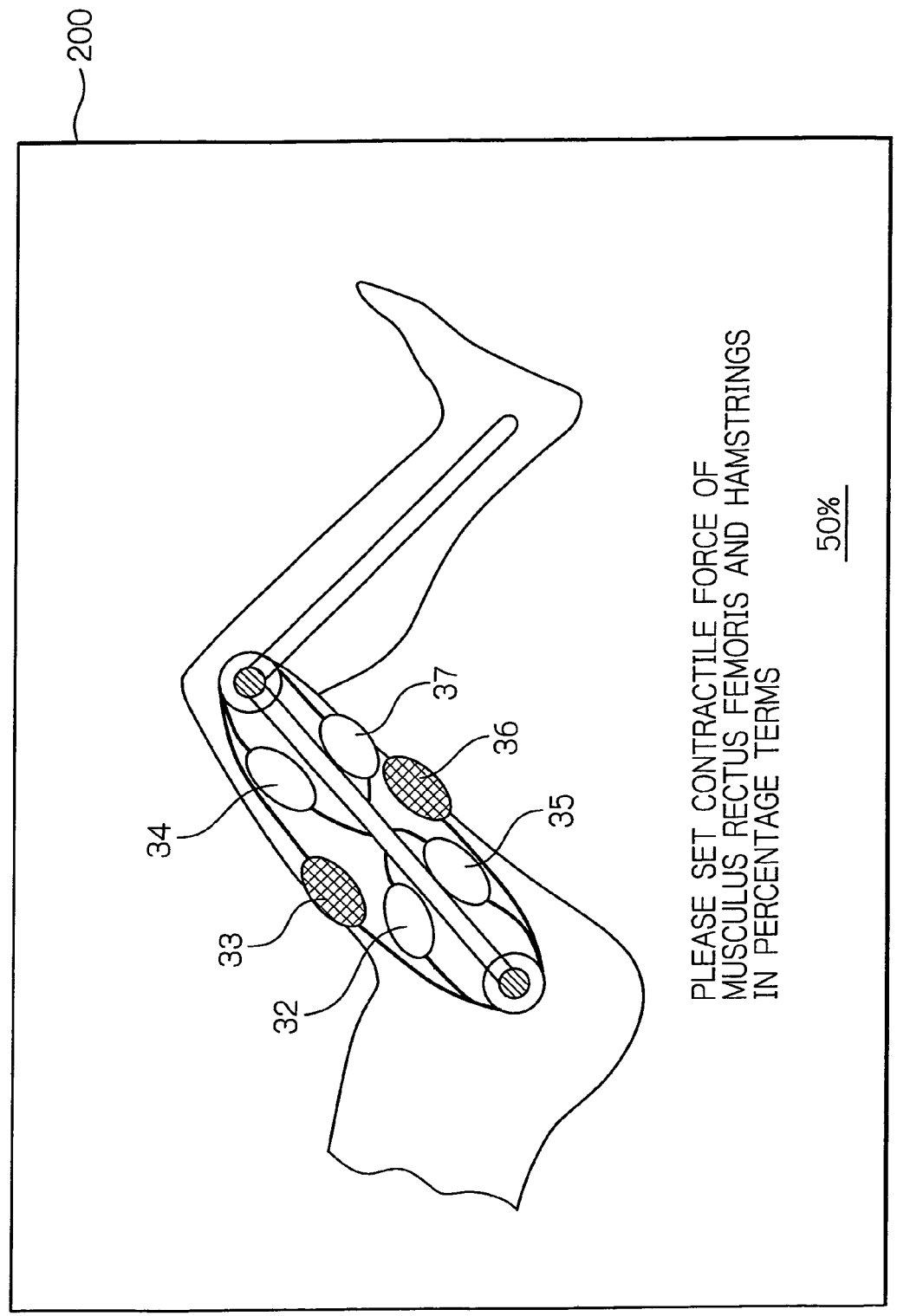
FIG. 12 schematically shows an example of a screen for setting the muscular force of the lower limb according to the second embodiment.
Figure 13:
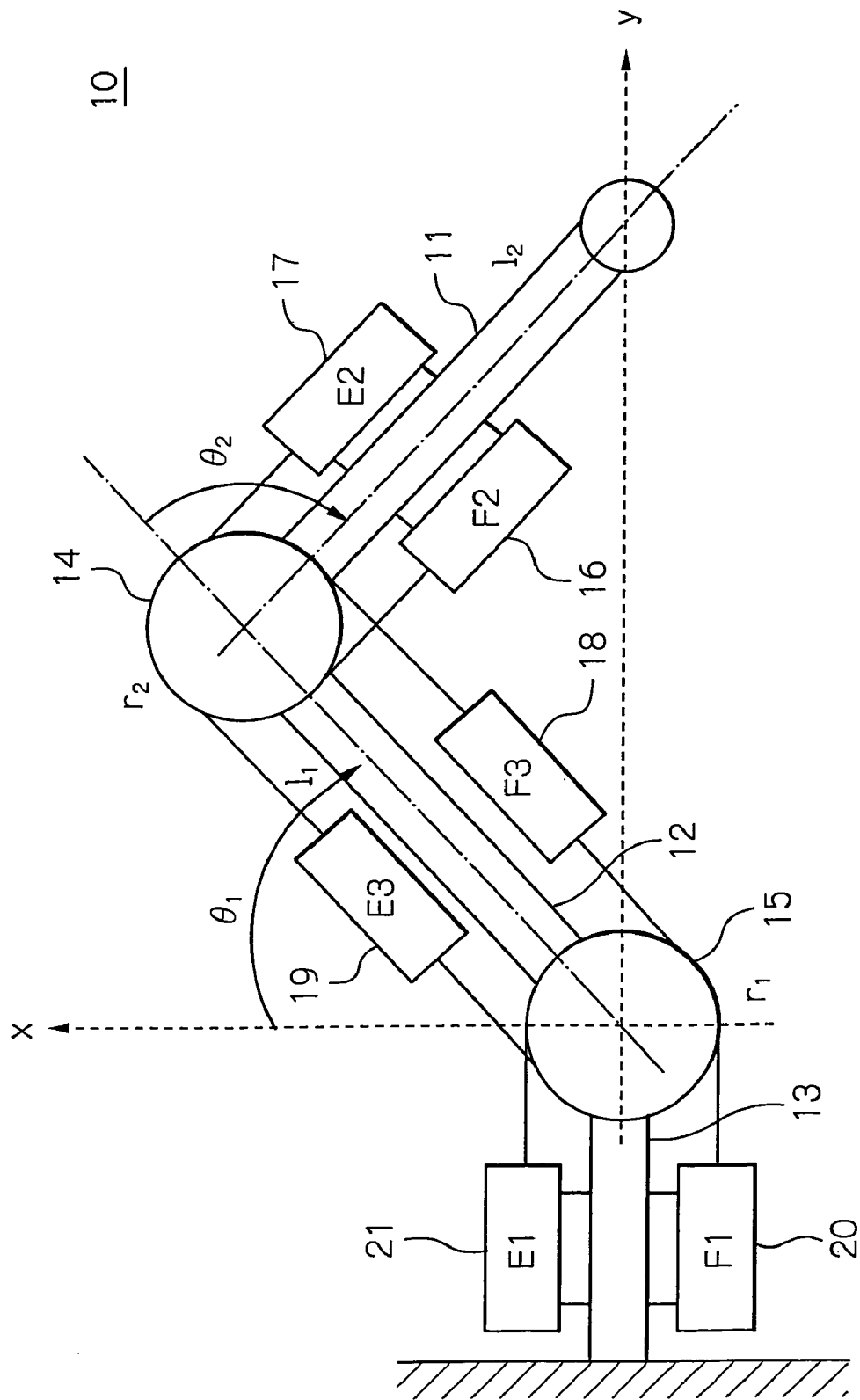
FIG. 13 schematically shows the direction of the force generated at the distal end of the bi-articular arm device according to the second embodiment.

FIG. 11 shows an example of a screen for setting the lower limb position in the second embodiment. FIG. 12 shows an example of a screen for setting the muscular force of the lower limb in the second embodiment. FIG. 13 illustrates the force generated at the distal end of the bi-articular arm device in the second embodiment.

First, the rehabilitator inputs, in the input screen demonstrated on the display 200 of the operational terminal, shown in FIG. 11, an angle $\theta_1$ of hip joint and an angle $\theta_2$ of knee joint, to determine the position of the lower limb. The rehabilitator then sets, in the input screen demonstrated on the display 200 of the operational terminal, shown in FIG. 12, the contractile forces of the antagonistic muscles, that is, the lateral vastus muscle 34—short head of biceps femoris muscle 37, the iliopsoas muscle 32—musculus gluteus maximus 35 and the musculus rectus femoris 33—hamstrings 36, to respective optional values. When the preparations for the inputting have come to a close, the operational terminal transmits a command to the controller, controlling the operation of the bi-articular arm device 10, or to the higher-order device.

The controller then controls the first to sixth actuators 16 to 21, as reference is made to the encoders 14d and 15d, so that the hip joint angle and the knee joint angle will be equal to input target angles $\theta_1$ and $\theta_2$, respectively, as shown in FIG. 13.

After the hip joint angle and the knee joint angle have reached the target angles (hip joint angle=$\theta_1$ and knee joint angle=$\theta_2$), the controller controls the motors 40 of the respective actuators, as reference is made to the first potentiometer 44 and to the second potentiometer 45, to displace the springs 46 to give the as-set contractile forces to the first actuator 16—second actuator 17, third actuator 18-fourth actuator 19 and to the fifth actuator 20-sixth actuator 21. At the time point of completion of the control of the first to sixth actuators 16 to 21, the control terminal advises the rehabilitator of the completion of preparations, and instructs the rehabilitator to go through the training of rehabilitation, as he or she holds the distal end of the first link 11, that is, the distal end of the bi-articular arm device 10.

In FIG. 13, $r_1$ is the radius of the hip pulley 15a mounted on the second link, $r_2$ is the radius of the knee pulley 14b mounted on the first link, $l_1$ is the length of the second link 12 and 12 is the length of the first link $l_1$. Reference numerals $\theta_1$ and $\theta_2$ are defined as shown in FIG. 13. Further, the outputs of the first actuator 16, second actuator 17, third actuator 18, fourth actuator 19, fifth actuator 20 and the sixth actuator 21 are $Ff_2$, $Fe_2$, $Ff_3$, $Fe_3$, $Ff_1$ and $Fe_1$, respectively.

The x-axis component $F_x$ and the y-axis component $F_y$ of the output of the distal end of the bi-articular arm device 10 may be expressed by the following expression (1):

$$\begin{pmatrix} Fx \\ Fy \end{pmatrix} = \frac{r}{l_1 \sin\theta_2}\begin{pmatrix} \cos(\theta_1+\theta_2) \\ \sin(\theta_1+\theta_2) \end{pmatrix}(Ff_1 - Fe_1) + \frac{r}{l_1 l_2 \sin\theta_2}\begin{pmatrix} -l_1\cos - l_2\cos(\theta_1+\theta_2) \\ -l_2\sin - l_2\sin(\theta_1+\theta_2) \end{pmatrix}(Ff_2 - Fe_2) + \frac{r}{l_2 \sin\theta_2}\begin{pmatrix} -\cos\theta_1 \\ -\sin\theta_1 \end{pmatrix}(Ff_3 - Fe_3) \quad (1)$$

where $r = r_1 = r_2$.

In the initial state, $Ff_1=Fe_1$, $Ff_2=Fe_2$ and $Ff_3=Fe_3$, so that $F_x=F_y=0$. Thus, the output of the distal end of the bi-articular arm device 10 is zero.

It is now assumed that, from this state, the rehabilitator displaces the distal end of the bi-articular arm device 10, in a direction a in FIG. 7, to start the process of rehabilitation exercise. Since the force acts on the spring 46 of the sixth actuator 21 in a compressing direction, the controller deems that the output of the sixth actuator 21 is increasing. Conversely, the force acts on the spring 46 of the fifth actuator 20 in an elongating direction, and hence the controller deems that the output of the fifth actuator 20 is decreasing. In similar manner, the controller deems that the outputs of the first actuator 16 and the third actuator 18 are increasing, while the outputs of the second actuator 17 and the fourth actuator 19 are decreasing.

This means that, since the force has been applied in the direction a, beginning from the counterbalanced states of the paired actuators, the force of reaction has been generated in the direction d. The actuator, deemed to be generating a larger output, contributes to generation of the force of reaction in the direction d. Hence, the controller designates the sixth actuator 21, first actuator 16 and the third actuator 18 for the higher-order device, to demonstrate these actuators on the display 200 of the operation terminal. Thus, the rehabilitator may confirm on the display 200 of the operation terminal which actuators are being loaded by his or her process of rehabilitation exercise.

Thus, in the present embodiment, when the rehabilitator sets the contractile force of each muscle, the output corresponding to the so set contractile force is generated by the relevant actuator(s). Thus, when the rehabilitator holds the distal end of the bi-articular arm device 10 and goes through the training of rehabilitation, the actuator(s) generating the corresponding force of reaction may be displayed. The rehabilitator may then judge easily which of the actuators are being loaded by his or her process of rehabilitation exercise to recognize the favorable effect of the rehabilitation.

A further alternative, third embodiment of the present invention will now be described. The parts or components which are the same as the first and second embodiments are depicted by the same reference numerals and a repetitive description thereof will be dispensed with. The description of the operation or the favorable effect similar to that of the first or second embodiment will also be dispensed with.

Figure 14:
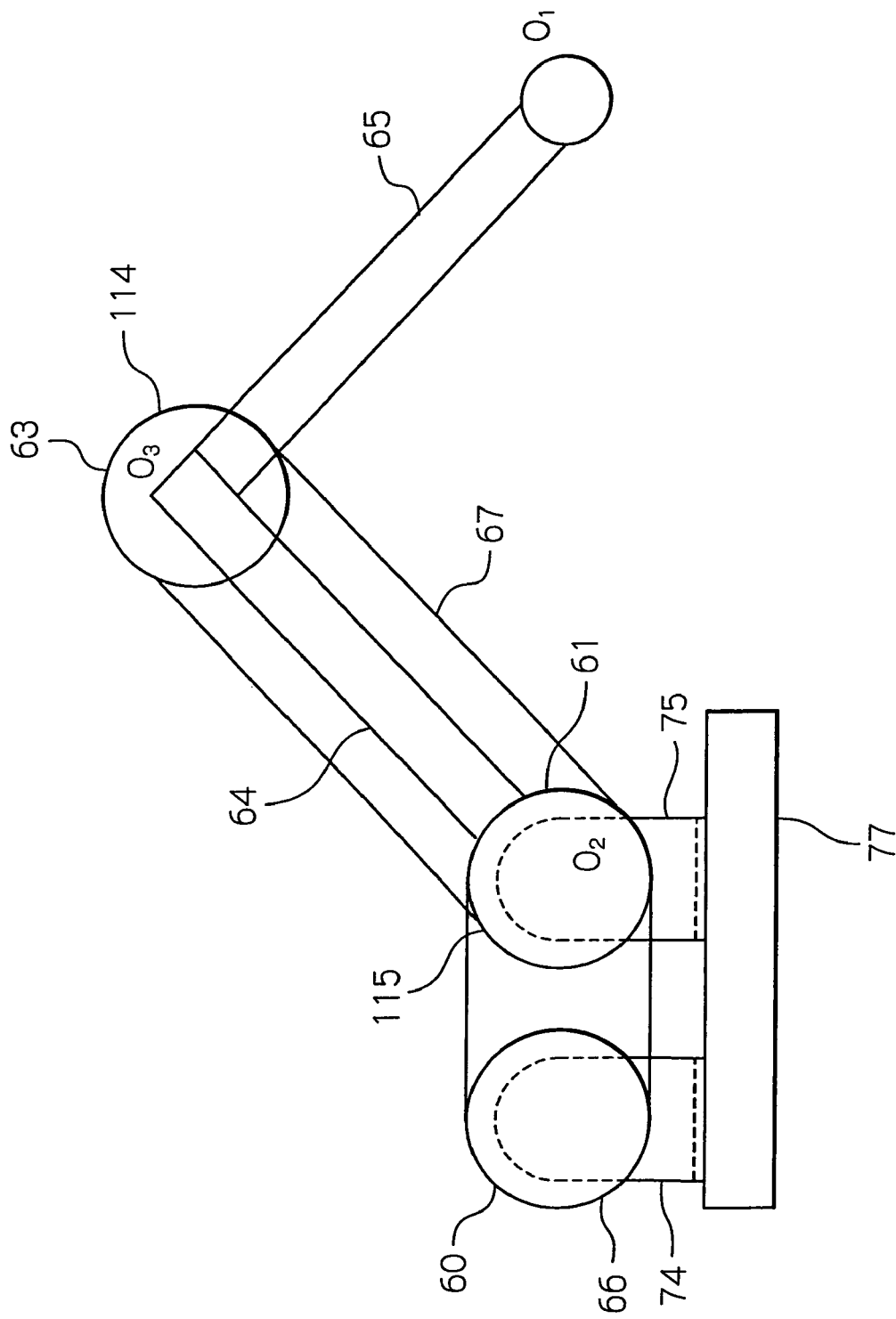
FIG. 14 is a schematic front view showing the constitution of a bi-articular arm device according to a third embodiment of the present invention.
Figure 15:
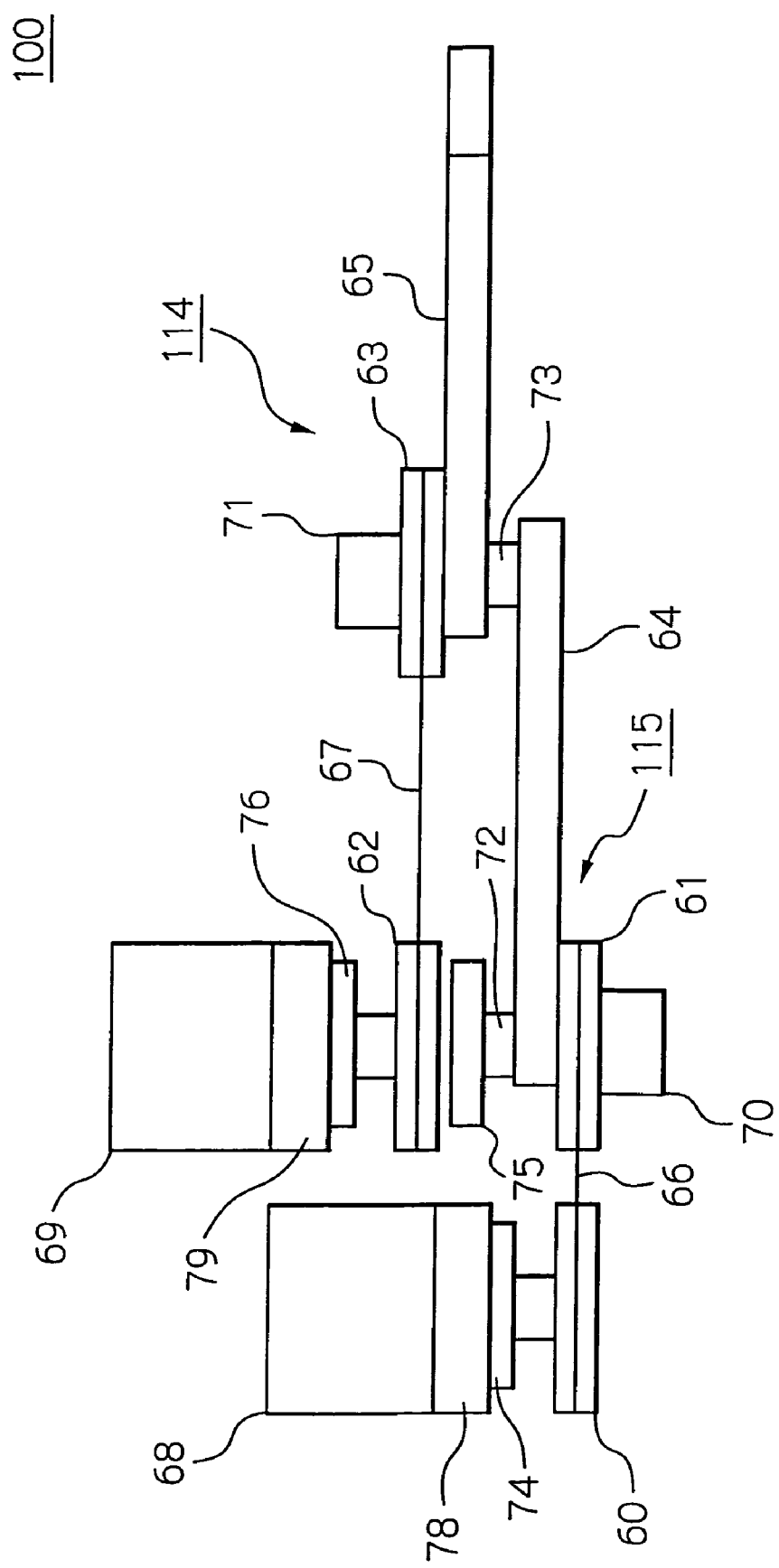
FIG. 15 is a side view schematically showing the constitution of a bi-articular arm device according to the third embodiment.
Figure 16:
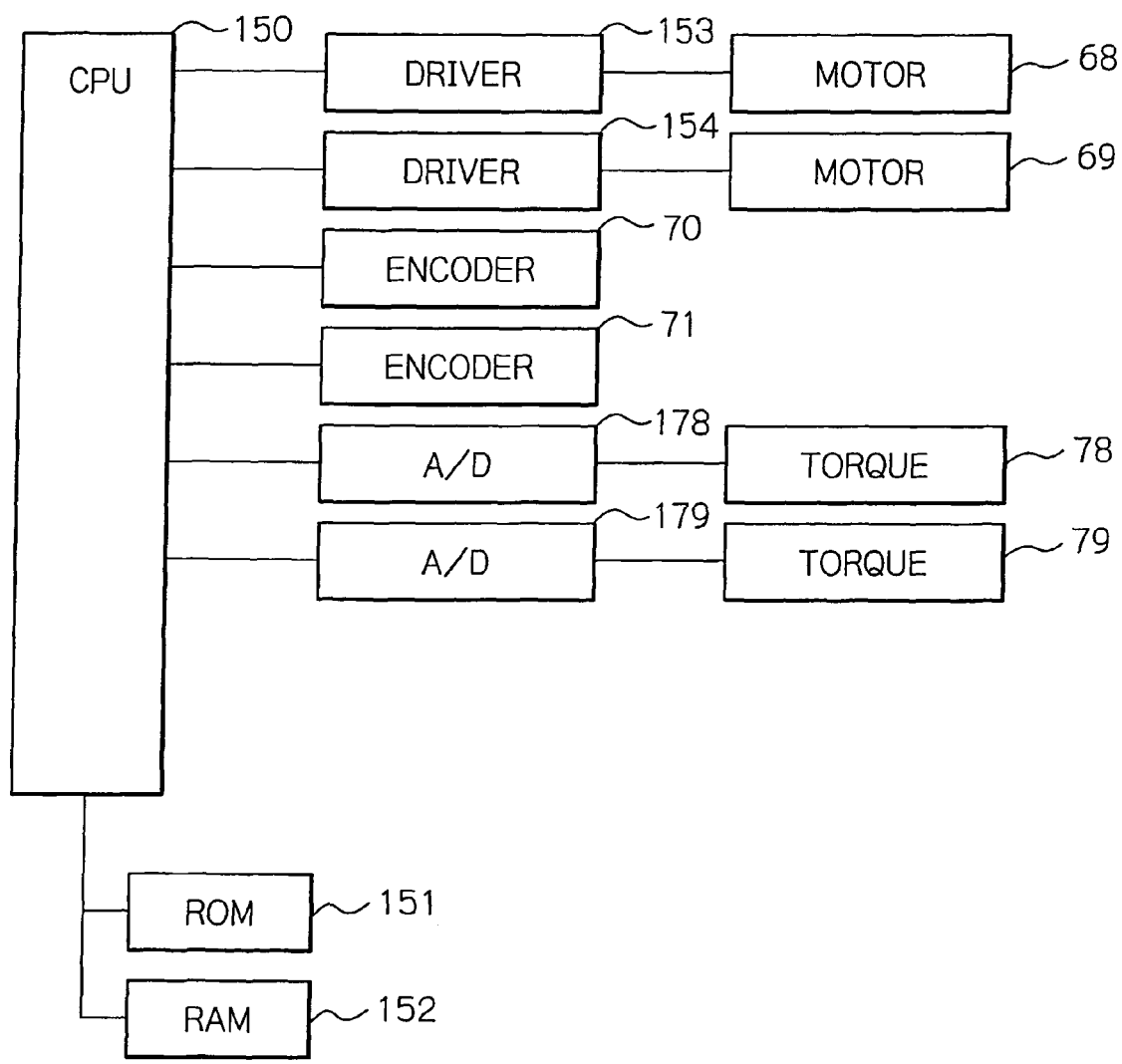
FIG. 16 is a schematic block diagram showing a controller for controlling the operation of the bi-articular arm device according to the third embodiment.

FIG. 14 is a front view showing the structure of a bi-articular arm device according to the third embodiment. FIG. 15 is a side view showing the structure of the bi-articular arm device according to the third embodiment. FIG. 16 is a block diagram showing a controller for controlling the operation of the bi-articular arm device according to the third embodiment.

In these figures, a bi-articular arm device 100, included in a robot for training a rehabilitator of the present embodiment, has a structure that simulates the lower limb of the human body.

The reference numerals 65 and 64 denote a first link that stands for the lower thigh and a second link that stands for the upper thigh, respectively. The reference numeral 77 denotes a frame as a base that stands for the waist. To the frame 77 is rotatably connected a root end of the second link 64 via the second joint section 115 that stands for the waist. To the distal end of the second link 64 is rotatably connected a root end of the first link 65 via the first joint section 114 that stands for the knee joint.

The second joint section 115 includes a hip pulley 61 mounted on the second link. This hip pulley is mounted on the proximal end of the second link 64. The hip pulley 61 mounted on the second link is rotatably mounted via a bush 72 to a first bracket 75, which is secured to the frame 77.

To the frame 77 is secured a first motor 68, as a first actuator, via a second bracket 74. On an output shaft of the first motor 68 is mounted a second link driving pulley 60, as a pulley, either directly or via a speed-reducing unit, not shown. A wire 66 is wrapped around a pulley 60 adapted for driving second link and around the hip pulley 61 mounted on the second link. The terminal ends of the wire 66 are secured to these pulleys 60, 61.

The second joint section 115 includes a hip pulley 62, mounted on the frame, as pulley. The hip pulley 62, mounted on the frame, is mounted on a third bracket 76 for rotation coaxially with the hip pulley 61 mounted on the second link. The third bracket 76 is secured to the frame 77. The hip pulley 62, mounted on the frame, is mounted, either directly or via a speed reducing unit, not shown, to an output shaft of the second motor 69, as the second actuator, secured to the third bracket 76.

The first joint section 114 includes a knee pulley 63 mounted on the proximal end of the first link. The knee pulley 63, mounted on the first link, is rotatably mounted via a bush 73 on the distal end of the second link 64. A wire 67 is wrapped around the hip pulley 62, mounted on the frame, and around the knee pulley 63, mounted on the first link. The terminal ends of the wire 67 are secured to these pulleys 62, 63.

An encoder 70 measures the angle of rotation of the second link 64 relative to the frame 77, about the center of rotation $O_2$ of the second joint section 115, whereas another encoder 71 measures the angle of rotation of the first link 65 relative to the second link 64, about the center of rotation $O_3$ of the first joint section 114. A torque sensor 78 measures the torque at an output axle of the first motor 68, or the same torque after deceleration, whereas a torque sensor 79 measures the torque at an output axle of the second motor 69, or the same torque after deceleration. These torque sensors measure the torque acting on the output axle.

In the present embodiment, the controller for controlling the operation of the bi-articular arm device 100 is configured as shown in FIG. 16. In this figure, the reference numeral 150 denotes a central processor unit as computing means. To this central processor unit 150 are connected a read-only memory 151 for storage of a program, as run on the central processor unit, for instance, and a random access memory 152 for temporary storage of data, used by the central processor unit 150 in running the program, for instance. To the central processor unit 150 are also connected drivers 153 and 154 as driver circuits for causing the operation of the first and second motors 68 and 69. These drivers 153 and 154 are responsive to instructions from the central processor unit 150 to cause the operation of the first and second motors 68 and 69. The encoder 70 for measuring the angle of rotation of the first link 65 relative to the second link 64 and the encoder 71 for measuring the angle of rotation of the second link 64 relative to the frame 77 are also connected to the central processor unit 150. Further, the outputs of the torque sensors 78 and 79 are supplied to the central processor unit 150 via analog-to-digital (A/D) converters 178 and 179, respectively.

The central processor unit 150 is connected for communication to a higher-order device, not shown, over a network, for instance. The higher-order device may be a computer including computing means, such as CPU or MPU, storage means, such as a magnetic disc or a semiconductor memory, inputting means, such as keyboard or mouse, display means, such as CRT or liquid crystal display, and communication means. The CPU comprehensively controls the operation of the bi-articular arm device 100. The central processor unit 50 transmits control signals to the drivers 153 and 154 to drive the first motor 68 and the second motor 69, in accordance with a stored program or with instructions by an operator as supplied via the inputting means.

Figure 17:
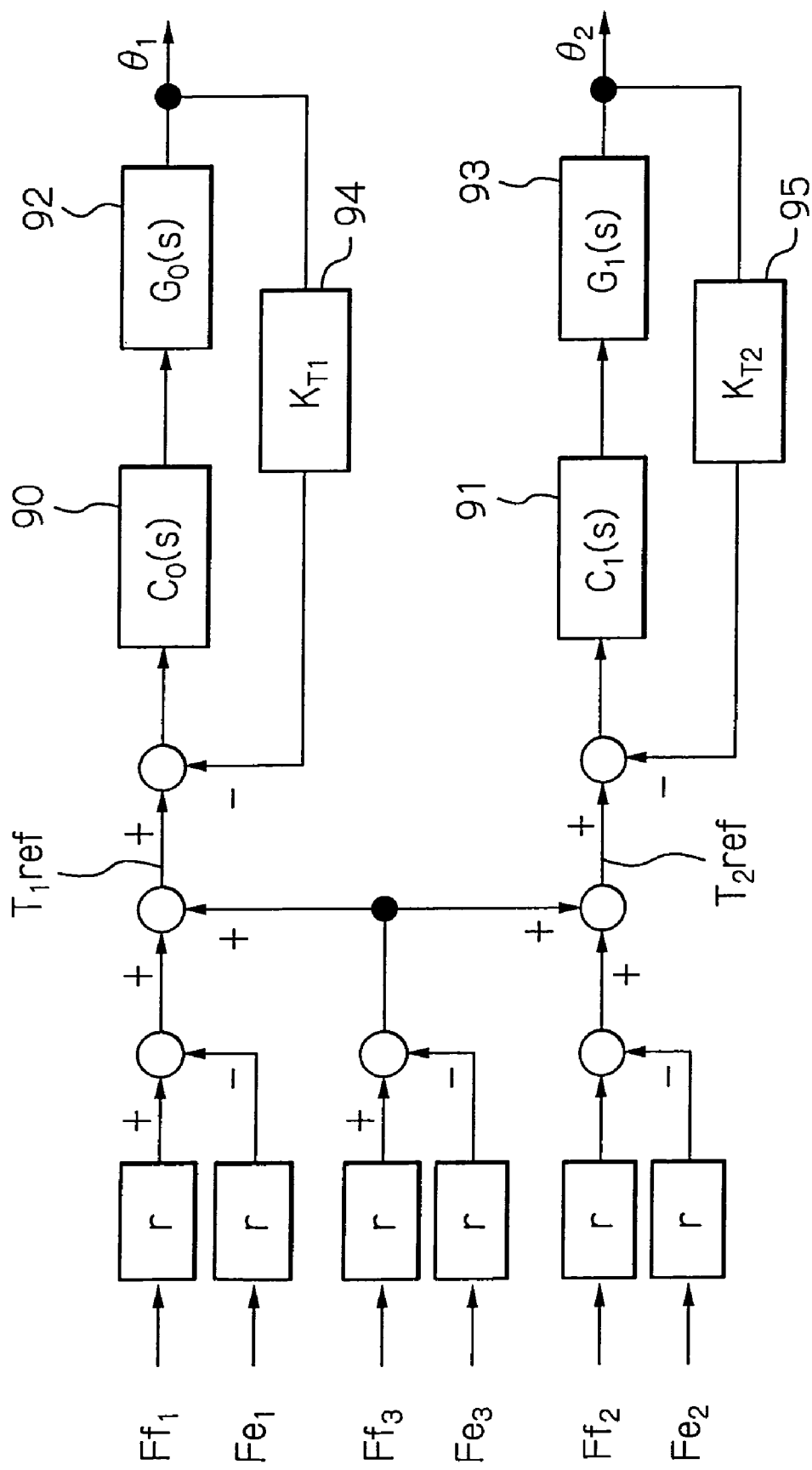
FIG. 17 is a control block diagram of the bi-articular arm device according to the third embodiment.
Figure 18:
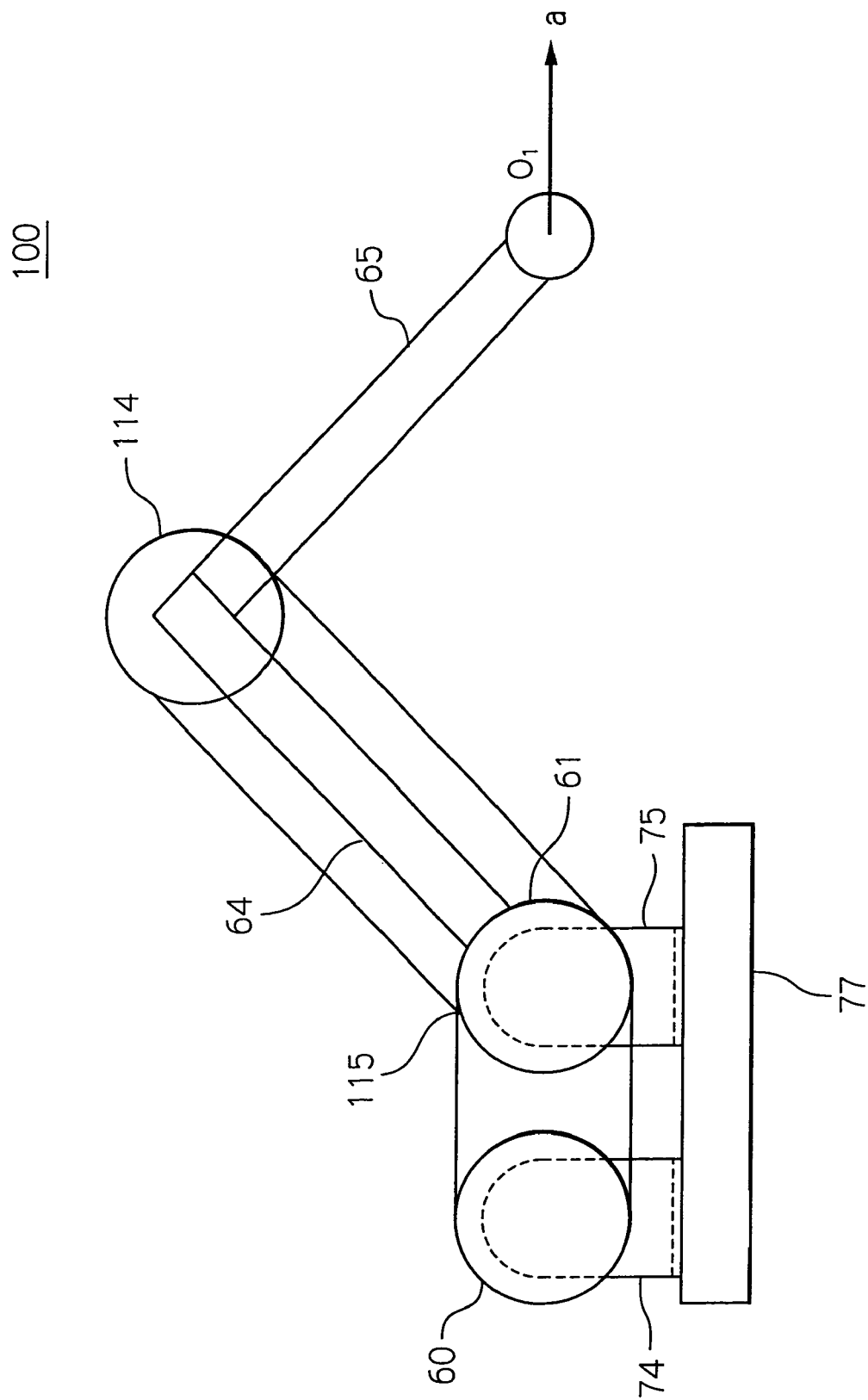
FIG. 18 schematically shows the direction of the force generated at the distal end of the bi-articular arm device according to the third embodiment.

The operation of the bi-articular arm device 100 of the present embodiment will now be described. FIG. 17 is a control block diagram of a bi-articular arm device according to a third embodiment of the present invention, and FIG. 18 is a schematic view for illustrating the direction of the force generated at the distal end of the bi-articular arm device according to the third embodiment.

Here, reference is made to FIGS. 6 to 10 for the first embodiment described above. In the bi-articular arm device 10 of the above-described first embodiment, shown in FIG. 7, the outputs of the first actuator 16, second actuator 17, third actuator 18, fourth actuator 19, fifth actuator 20 and the sixth actuator 21 are $Ff_2$, $Fe_2$, $Ff_3$, $Fe_3$, $Ff_1$ and $Fe_1$, respectively. The radius of the pulley constituting the first joint section 14 or the second joint section 15 is r.

In the bi-articular arm device 100 of the present embodiment, shown in FIGS. 14 and 15, the torques generated by the first and second motors 68, 69 are labeled $T_1$ and $T_2$, respectively. Then, the relationship between the torque $T_1$ generated by the first motor 68 of the bi-articular arm device 100 of the present embodiment, and the outputs of the actuators of the bi-articular arm device 10 of the above-described first embodiment, may be represented by the following expression (2):

$$T_1=(Ff_1-Fe_1)r+(Ff_3-Fe_3)r \quad (2).$$

On the other hand, the relationship between the torque $T_2$ generated by the second motor 69 of the bi-articular arm device 100 of the present embodiment, and the outputs of the actuators of the bi-articular arm device 10 of the first embodiment, may be represented by the following expression (3):

$$T_2=(Ff_2-Fe_2)r+(Ff_3-Fe_3)r \quad (3).$$

The control block diagram, which has taken in the above expressions (2) and (3), is as shown in FIG. 17. In this figure, the reference numerals 90, 91 denote controllers, the reference numerals 92, 93 denote transfer functions of the first motor 68 and the second motor 69, and the reference numerals 94, 95 denote conversion factors of the torque sensors 78 and 79, respectively. As regards the conversion factors, the input and the output are an angle and a torque, respectively.

First, the rehabilitator inputs the output direction of his or her lower limb, on an input screen demonstrated on the display 200 of the operation terminal shown in FIG. 9. When the output direction is input, the muscle correlated with the direction, for example, the muscle needed for exerting the force in a direction a, if such direction a has been selected by the rehabilitator, is changed in color on the screen, for recognition by the rehabilitator.

The rehabilitator then holds the vicinity of the center $O_1$ at the distal end of the bi-articular arm device 100 shown in FIG. 18, and acts on the operation terminal to input the fact that preparations have been completed. The inputting operation may be by acting on a return key of a keyboard of the operation terminal or by voice inputting using the speech recognition function of the operation terminal. When the fact that preparations have been completed is input, the operation terminal transmits a command to the controller or to a higher-order device. The controller or the higher-order device then selects the actuator(s) for the received command.

Here, the direction a has been selected, so that, in the case of the bi-articular arm device 10 of the first embodiment, described above, the second actuator 17, fourth actuator 19 and the fifth actuator 20 are selected, in accordance with the sequences shown in FIG. 6.

So, the outputs of the second actuator 17, fourth actuator 19 and the fifth actuator 20 are respectively set to $Fe_2$, $Fe_3$ and $Ff_1$, respectively, as input values of the control blocks shown in FIG. 7. The outputs of the other actuators are set to zero.

Then, a target torque value $T_1$ref, generated by the first motor 68, and a target torque value $T_2$ref, generated by the second motor 69, are calculated from the selected input values. The first motor 68 and the second motor 69 start to be controlled, based on manipulated variables output from the controllers 90 and 91, respectively.

When the first motor 68 and the second motor 69 have started to be controlled, the distal end of the bi-articular arm device 100 starts to be moved in the direction a. Since the rehabilitator holds the vicinity of the center $O_1$ of the distal end, he or she may physically experience the direction of the force, that is, the direction a, and the magnitude thereof.

Also, since the rehabilitator may set the force generated by each muscle on the input screen, shown in FIG. 10, in advance, he or she is able to learn the direction and the magnitude of the force ascribable to variations in muscular force.

The above operations may also be carried out without the rehabilitator being informed of the direction of the force or the set values of the respective muscles. The rehabilitator then judges the direction and the magnitude of the force to report the result. Thus, the present device may be used for conducting ability tests for the rehabilitator.

Thus, with the present embodiment, the torques output by the first motor 68 as the first actuator and by the second motor 69 as the second actuator may be calculated from the relationship between the driving sequences of the respective actuators on one hand and the torques applied by the outputs of the respective actuators on the respective joints, on the other hand. By so doing, it is possible to reproduce the favorable effect equivalent to that achieved with the use of the six actuators, with the use only of two actuators. Hence, the bi-articular arm device 100 may be reduced in size and in production costs.

A still further alternative, fourth embodiment of the present invention will now be described. The parts or components which are the same as the first to third embodiments are depicted by the same reference numerals and a repetitive description thereof will be dispensed with. A repetitive description of the operation or advantages similar to that of the first to third embodiments will also be dispensed with.

Figure 19:
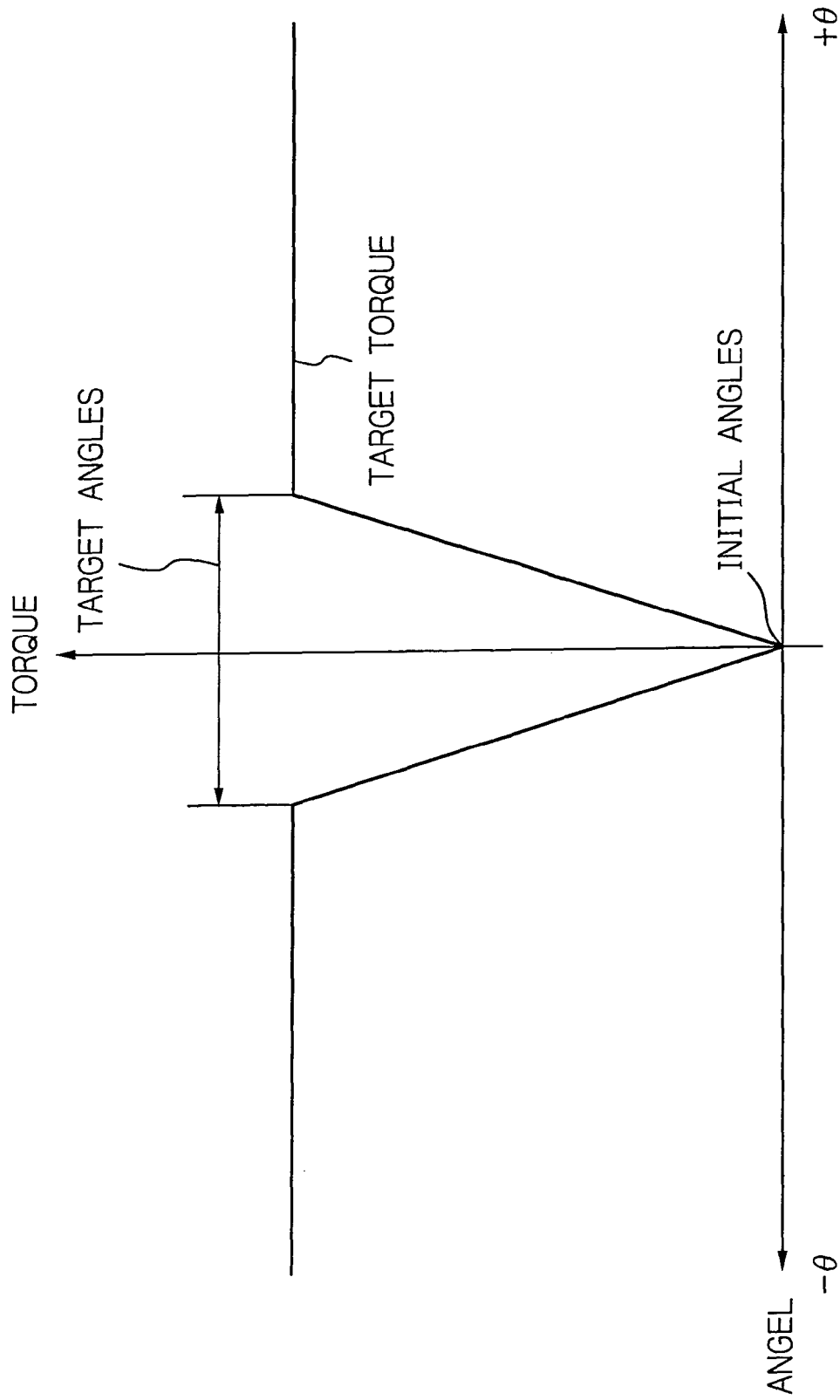
FIG. 19 is a diagram useful for understanding a target torque in a fourth embodiment of the present invention.
Figure 20:
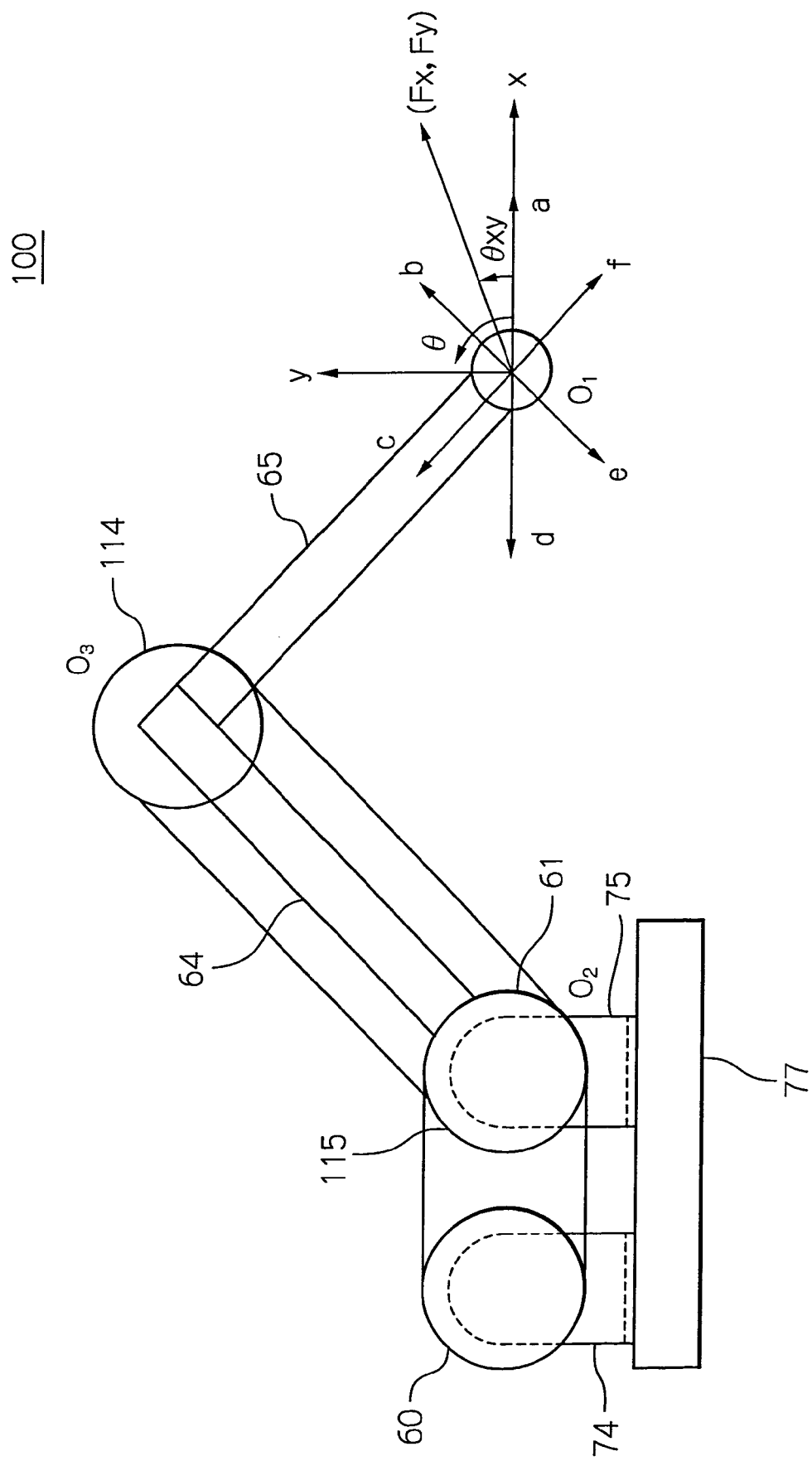
FIG. 20 is a diagram useful for understanding the operation of a bi-articular arm device according to the fourth embodiment.
Figure 21:
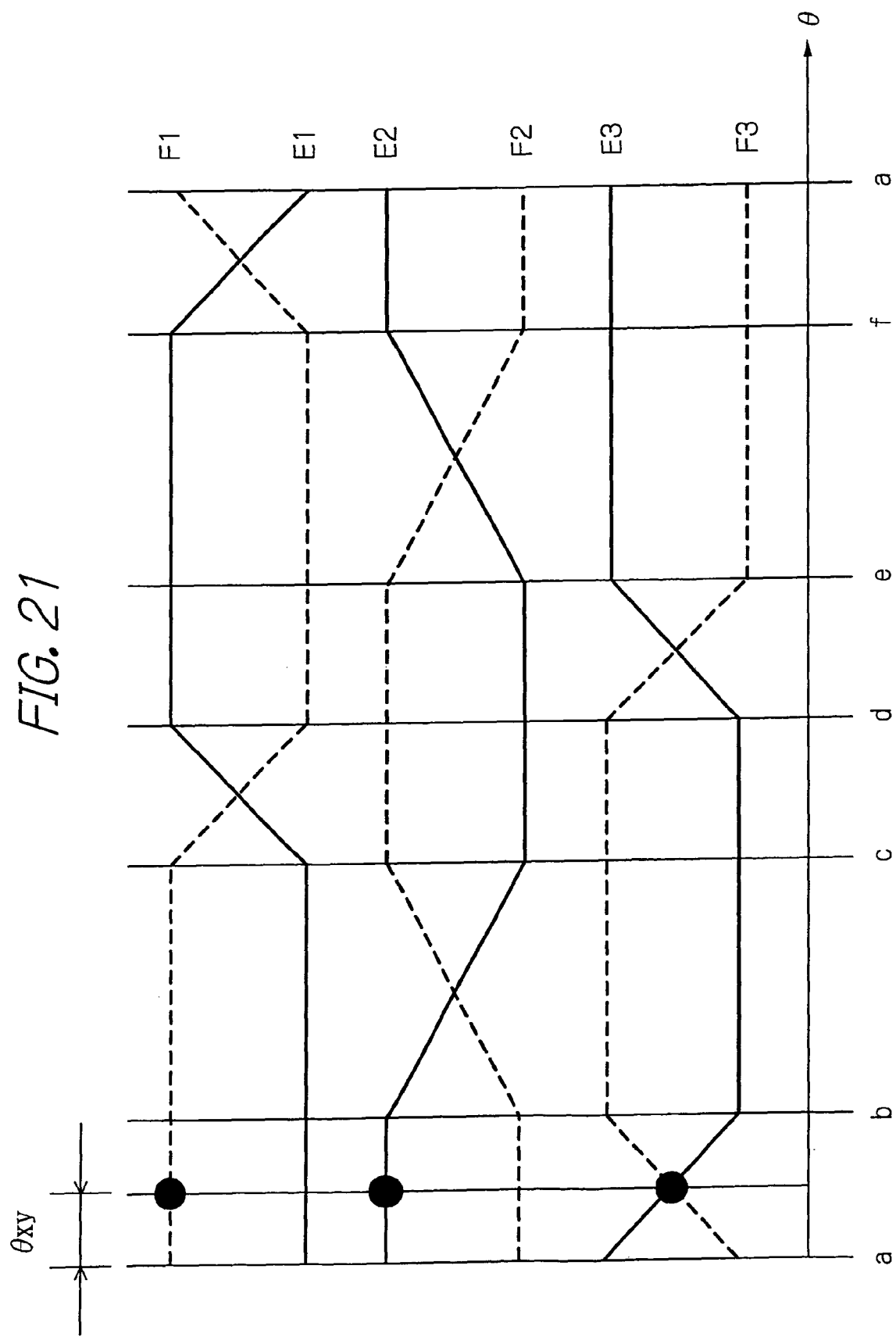
FIG. 21 schematically shows a driving sequence of an actuator and the force directions according to the fourth embodiment.

FIG. 19 illustrates the target torque in the fourth embodiment. FIG. 20 illustrates the operation of a bi-articular arm device in the fourth embodiment and FIG. 21 shows the driving sequence and the force direction of the actuator in the fourth embodiment.

Since the constitution of the robot for training a rehabilitator is similar to that of the above-described third embodiment, the corresponding description is dispensed with. The description on the operation will be made as reference is made to FIGS. 11 to 13 and 17 for the above-described second and third embodiments.

The rehabilitator inputs the hip joint angle and the knee joint angle, on an input screen demonstrated on the display 200 of the operation terminal shown in FIG. 11, to decide on the position of his or her lower limb. The rehabilitator then sets the contractile forces of the antagonistic muscles, namely the lateral vastus muscle 34—short head of biceps femoris muscle 37, iliopsoas muscle 32—musculus gluteus maximus 35 and the musculus rectus femoris 33—hamstrings 36, to desired optional values. On completion of preparations for the inputting operation, the operation terminal transmits a command to a controller or a higher-order device that controls the operation of the bi-articular arm device 100.

The controller then controls the first motor 68 as the first actuator and the second motor 69 as the second actuator, so that the hip joint angle and the knee joint angle will be equal to the input target angles $\theta_1$ and $\theta_2$, respectively, as reference is made to the encoders 70 and 71, as shown in FIG. 13.

After the hip joint angle and the knee joint angle have reached the target angles (hip joint angle=$\theta_1$ and the knee joint angle=$\theta_2$), the controller inputs the contractile force of each muscle, as input, to the control block shown in FIG. 17. The target torque value $T_1$ref, generated by the first motor 68, and the target torque value $T_2$ref, generated by the second motor 69, are calculated from the selected input values. The first motor 68 and the second motor 69 start to be controlled, based on manipulated variables, output by the controllers 90, 91.

At this time point, the operation terminal advises the rehabilitator that the preparations have been finished, and instructs him or her to hold the distal end of the bi-articular arm device 100 to go through the training of rehabilitation. The rehabilitator then holds the distal end of the bi-articular arm device 100 to start the training for rehabilitation.

It is assumed that the force has been exerted in a direction intermediate between the directions d and e in FIG. 20. The hip joint angle and the knee joint angle are varied at this time and the magnitude of the torque is controlled in dependence upon the changes in these angles. FIG. 19 shows a control example. That is, control is exercised so that, from the initial angles, herein $\theta_1$ and $\theta_2$, up to a predetermined angle, the angle and the torque are proportionately changed, and so that, above the predetermined angle, the torque is at a target value.

Then, at a time point when the torques $T_1$ and $T_2$, generated by the first and second motors 68 and 69, respectively, are coincident with the target values $T_1$ref and $t_2$ref, respectively, the prevailing values of the hip joint angle $\theta_1$ and the knee joint angle $\theta_2$ are detected. An x-axis component $F_x$ and a y-axis components $F_y$ of the outputs at the distal end of the bi-articular arm device 100 are then calculated in accordance with the following expression (4):

$$\begin{pmatrix} Fx \\ Fy \end{pmatrix} = \frac{r}{l_1 l_2 \sin\theta_2} \begin{pmatrix} l_2\cos(\theta_1 + \theta_2) & -l_1\cos\theta_1 - l_2\cos(\theta_1 + \theta_2) \\ l_2\sin(\theta_1 + \theta_2) & -l_1\sin\theta_1 - l_2\sin(\theta_1 + \theta_2) \end{pmatrix} \begin{pmatrix} T_1 \\ T_2 \end{pmatrix} \quad (4)$$

Assume that the input position is as shown in FIG. 20. If the lengths of the first link 65 and the second link 64 are equal to each other, the center point $O_1$ of the distal end and the center of rotation $O_2$ of the second joint section 115 are on the same straight line, and the angle between line segments $O_2$-$O_3$ and $O_1$-$O_3$ is 90°, the directions a and d are on a line segment $O_2$-$O_1$, the directions b and e are parallel to the line segment $O_2$-$O_3$ and the directions c and f are on a line segment $O_3$-$O_1$. If, with the center point $O_1$ of the distal end as a point of origin, the x and y axes are taken as indicated in FIG. 20, and $\theta$ is taken counterclockwise from the x axis, the result is as shown in FIG. 21.

Then, ($F_x$, $F_y$), as found from the expression (4), is plotted on an x-y plane. The angle ($F_x$, $F_y$) makes with the x-axis is found as $\theta_{xy}$ and plotted on FIG. 21. It is shown that F1, E2, E3 and F3, which are in driven states in the plotted position, are actually in operation. This indicates that, since the force has been applied in a direction intermediate between the directions d and e, the force of reaction has been generated in the opposite direction, viz. in a direction intermediate between the directions a and b. It is noted that F1, E2, E3 and F3 are associated with the iliopsoas muscle 32, short head of biceps femoris muscle 37, hamstrings 36 and the musculus rectus femoris 33, respectively.

The controller then notifies the higher-order device of the outputs and the names of the muscles, namely F1 (iliopsoas muscle 32), E2 (short head of biceps femoris muscle 37), E3 (hamstrings 3) and F3 (musculus rectus femoris 33), for demonstration thereof on the display 200 of the terminal device. The rehabilitator may then see on the display 200 of the terminal device which actuator(s) are loaded as a result of his or her training in rehabilitation.

Thus, in the present embodiment, the output direction at the distal end is calculated from the torques applied to the hip joint and the knee joint and from the angles of rotation. The virtual actuator(s) in the driving state is found from the so calculated output direction. The rehabilitator may then readily comprehend which virtual actuator(s) is being loaded by his or her rehabilitation operation. Hence, the rehabilitator may recognize the effect of his or her rehabilitation exercise. Further, the bi-articular arm device 100 may be reduced in size and production cost.

A still another alternative, fifth embodiment of the present invention will now be described. The parts or components which are the same as the first to fourth embodiments are depicted by the same reference numerals and a repetitive description thereof will be dispensed with. A repetitive description of the operation or advantages similar to that of the first to fourth embodiments will also be dispensed with.

Figure 22:
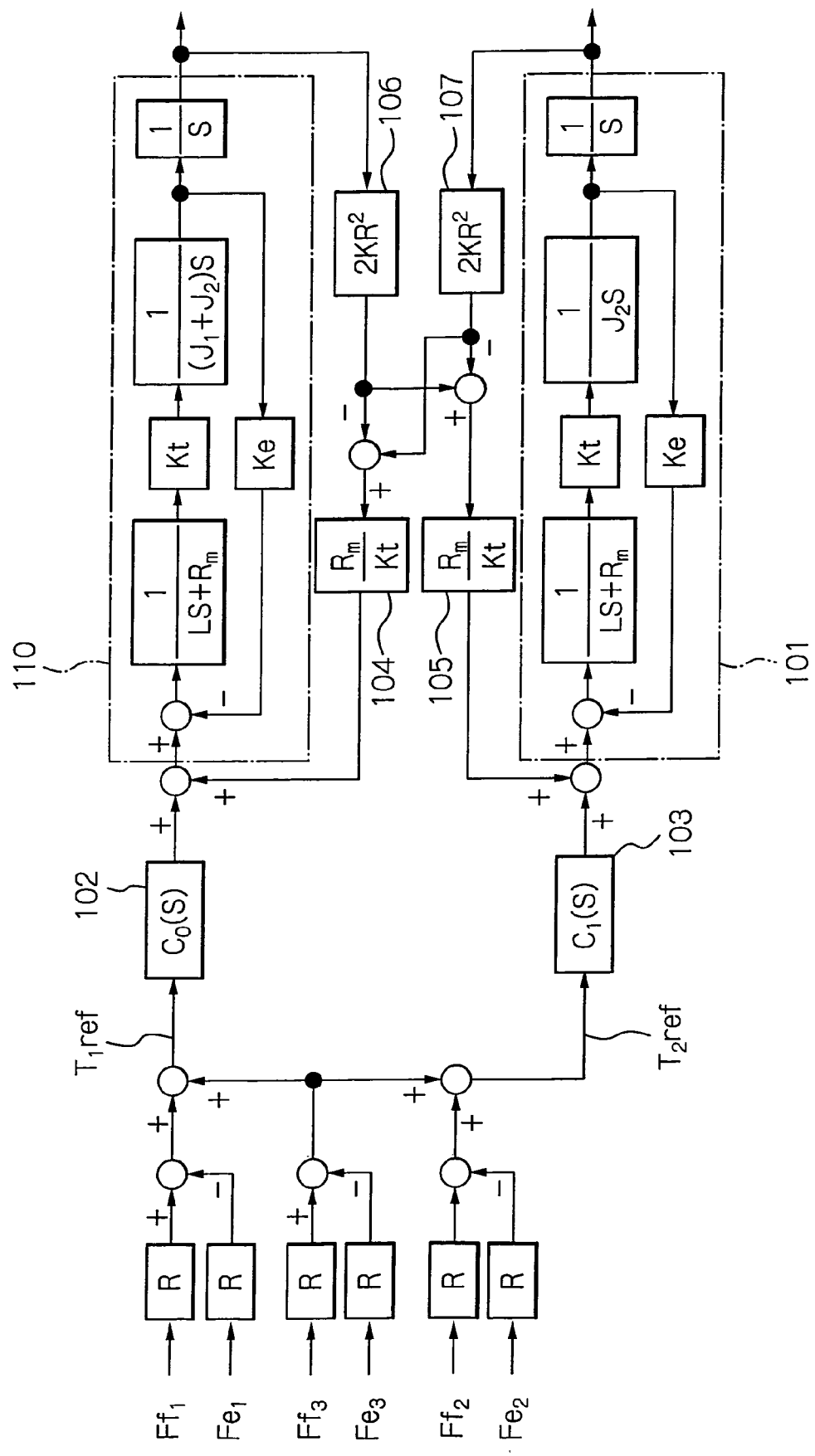
FIG. 22 is a control block diagram of a bi-articular arm device according to a fifth embodiment of the present invention.
Figure 23:
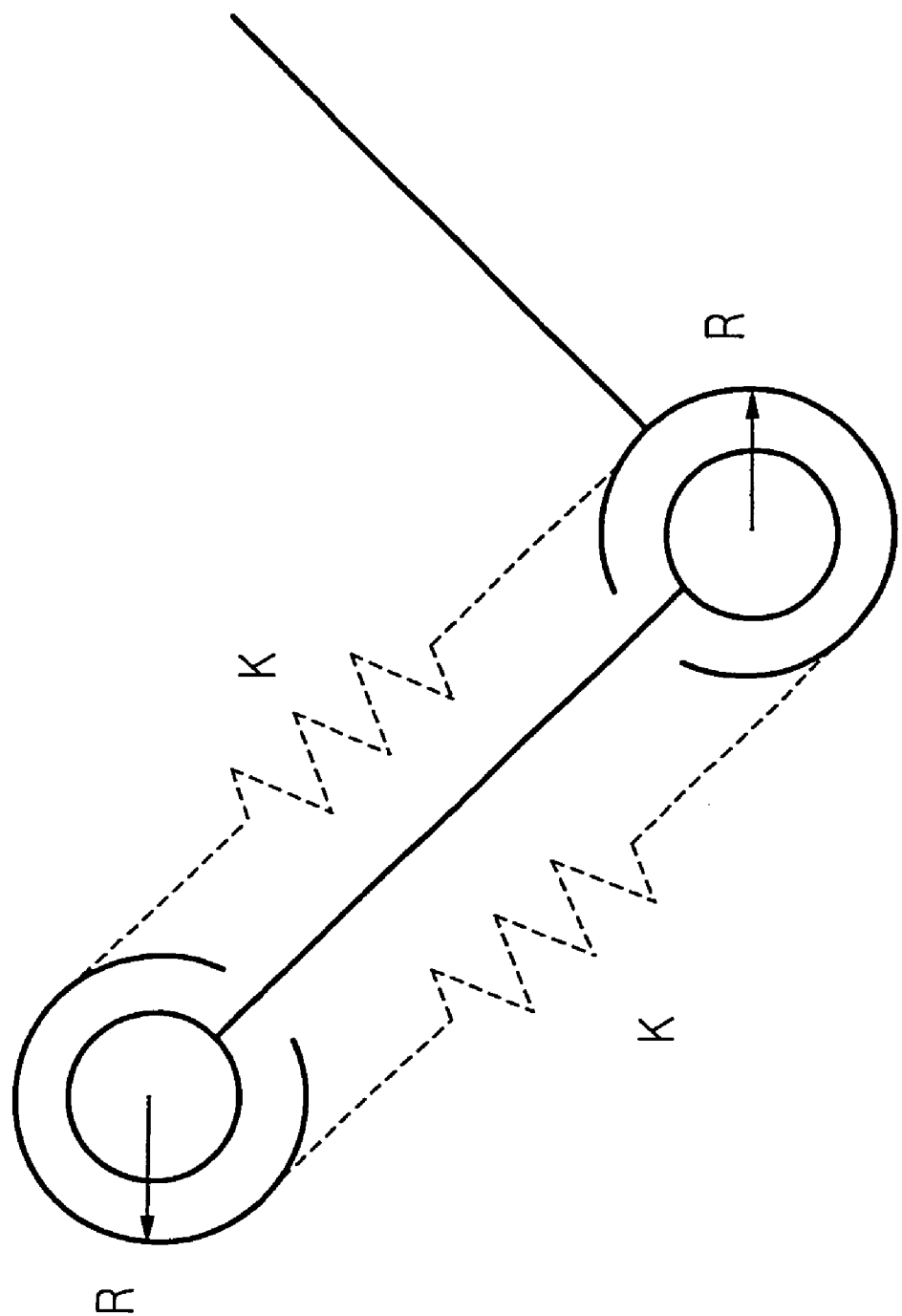
FIG. 23 is a schematic view for illustrating a spring element according to the fifth embodiment.

FIG. 22 is a control block diagram of a bi-articular arm device according to the fifth embodiment, and FIG. 23 schematically shows a spring element according to the fifth embodiment.

Since the constitution of the robot for training a rehabilitator is similar to that of the above-described third embodiment, a repetitive description thereof will be dispensed with.

The control block diagram of the bi-articular arm device 100 for the present embodiment is shown in FIG. 22. In this figure, a transfer function 110 for the first motor 68 includes inertial moments about the first link 65 and the second link 64. In similar manner, a transfer function 101 for the second motor 69 includes the inertial moment about the first link 65.

The reference numerals 102, 103 denote controllers for causing voltages corresponding to the target torque values $T_1$ref and $T_2$ref to be applied to the transfer functions 110, 101, as controlled objects, respectively. The reference numerals 106, 107 each denote a transfer function including the spring element K and a distance (radius) R from the center of rotation of the joint up to a point on which acts the spring, as shown in FIG. 23. The reference numerals 104 and 105 denote coefficients for conversion into voltages required for the first motor 68 and the second motor 69 to generate the torques equivalent to those generated by the spring elements K.

If, in FIG. 22, $Ff_1$ through $Ff_3$ and $Fe_1$ through $Fe_3$ are set to zero "0", the torque target values $T_1$ref and $T_2$ref are equal to "0". In this case, no voltage is applied to the first motor 68 or to the second motor 69.

If, in this state, the rehabilitator holds the distal end of the bi-articular arm device 100 and displaces it in an optional direction, the hip joint angle $\theta_1$ and the knee joint angle $\theta_2$ are varied. If variations from the initial angular values are denoted $\Delta\theta_1$ and $\Delta\theta_2$, torques $T_{K1}$ and $T_{K2}$, generated by the first motor 68 and the second motor 69, respectively, may be represented by the following expressions (5) and (6), $$T_{K1} = \Delta\theta_1 \times 2KR^2 \quad (5)$$

$$T_{K2} = \Delta\theta_2 \times 2KR^2 \quad (6)$$

Since the torques $T_{K1}$ and $T_{K2}$ reciprocally act on the first motor 68 and the second motor 69, respectively, the voltages $V_{K1}$ and $V_{K2}$, applied to the first and second motors 68, 69, may be calculated as indicated by the following expressions (7) and (8), $$V_{K1} = (-\Delta\theta_1 \times 2KR^2 + \Delta\theta_2 \times 2KR^2) \times Rm/Kt \quad (7)$$

$$V_{K2} = (\Delta\theta_1 \times 2KR^2 - \Delta\theta_2 \times 2KR^2) \times Rm/Kt \quad (8)$$

If the voltages $V_{K1}$ and $V_{K2}$ are applied to the first motor 68 and the second motor 69, respectively, these motors 68, 69 generate the torques $T_{K1}$ and $T_{K2}$, respectively. Since this generates the force at the distal end of the bi-articular arm device 100, the rehabilitator feels this force as the force of reaction. This force is generated by an external force applied to the spring element K, shown in FIG. 23, and reproduces an elastic element of the bi-articular muscle.

Thus, in the present embodiment, the elastic element of the bi-articular muscle is modeled, and changes in the rotational angles from the hip joint and the knee joint are measured. The elastic element is found as the torques acting on two joint axles and converted into driving voltages of the first and second motors 68, 69 that drive the joints, thereby driving the first and second motors 68, 69. This enables the operation of the bi-articular muscle to be virtually reproduced to allow the rehabilitator to physically experience the operation of the bi-articular muscle.

A still further alternative, sixth embodiment of the present invention will now be described. The parts or components which are the same as the first to fifth embodiments are depicted by the same reference numerals and a repetitive description thereof will be dispensed with. A repetitive description of the operation or advantages similar to that of the first to fifth embodiments will also be dispensed with.

Figure 24:
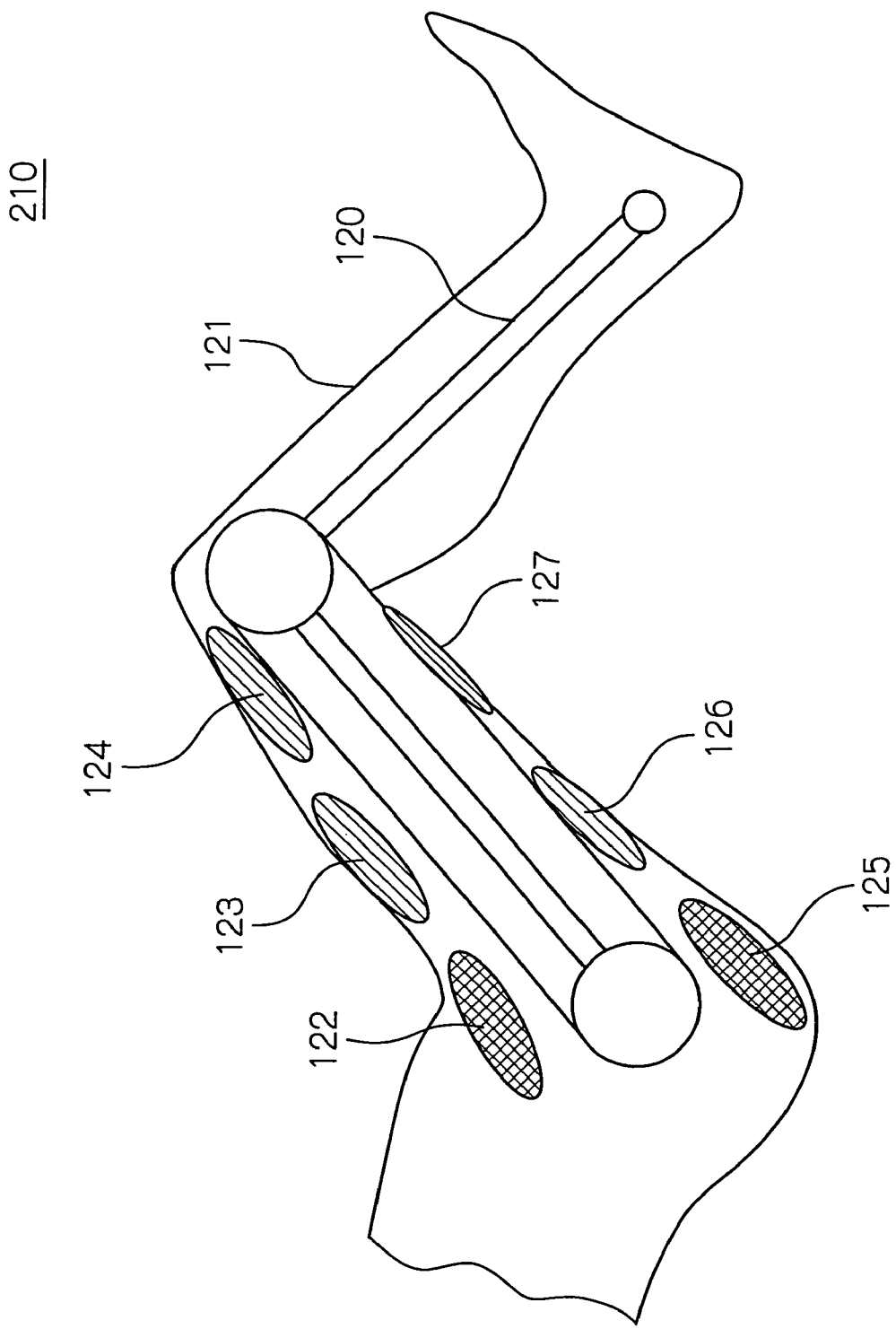
FIG. 24 is a side view showing the constitution of a bi-articular arm device according to a sixth embodiment of the present invention.
Figure 25:
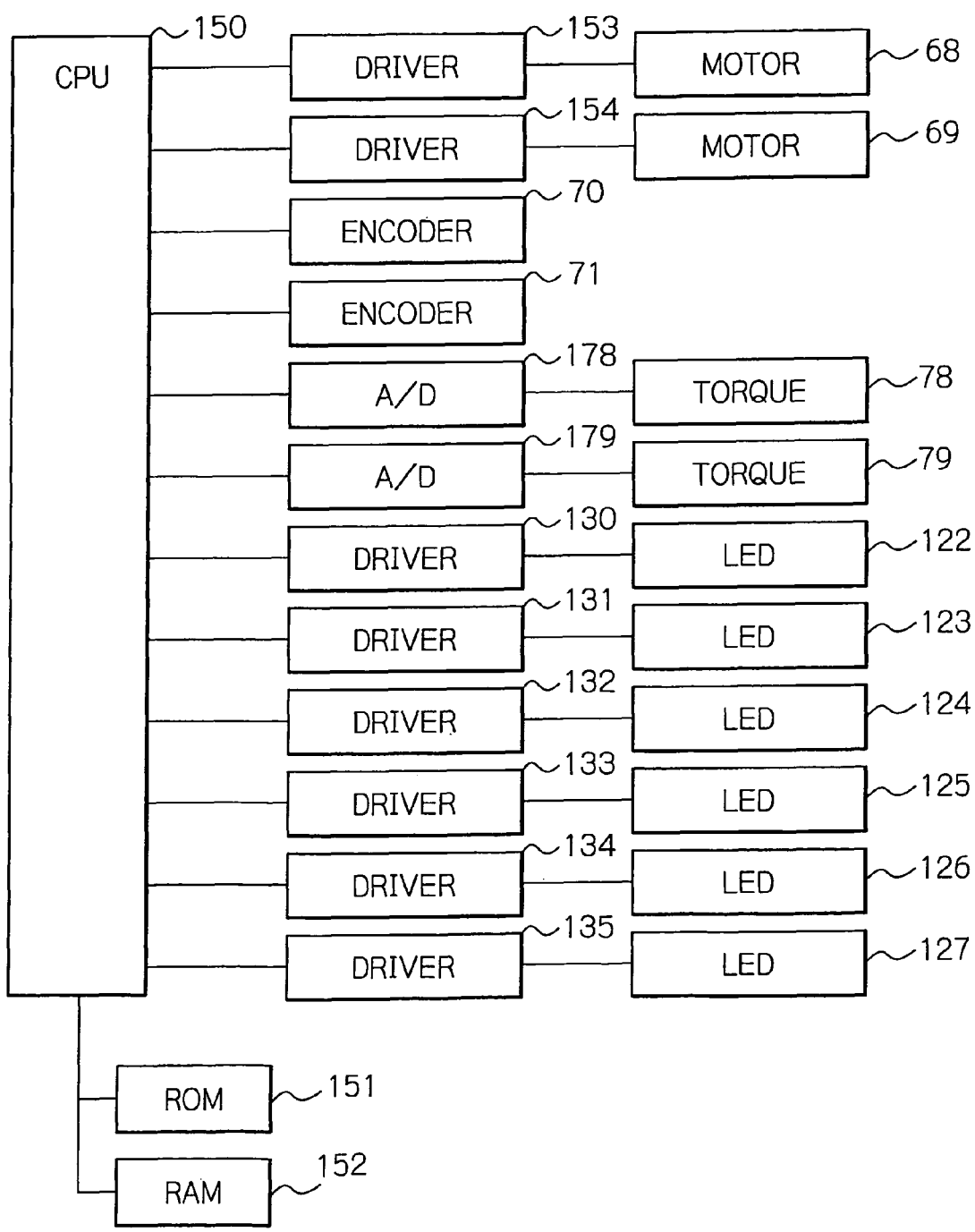
FIG. 25 is a block diagram showing a controller for controlling the operation of the bi-articular arm device according to the sixth embodiment

FIG. 24 is a schematic side view showing the constitution of a bi-articular arm device according to a sixth embodiment. FIG. 25 is a block diagram showing a controller controlling the operation of the bi-articular arm device according to the sixth embodiment.

In FIG. 24, a bi-articular arm device 210, provided in a robot for training a rehabilitator of the present embodiment, includes a structure that simulates the lower limb of the human body. The bi-articular arm device 210 includes a mechanical unit 120 and a skin unit 121. Meanwhile, the mechanical unit 120 is identical with the bi-articular arm device 10 of the above-described first embodiment and with the bi-articular arm device 100 of the third embodiment. Hence, the description of the constitution and the operation thereof is dispensed with.

The skin unit 121 is formed of a soft material, such as expandable rubber or urethane foam, and is applied to cover up the surface of the mechanical unit 120. The skin unit 121 is provided with light emitting sections 122 to 127 composed of light emitting elements, such as lamps or light-emitting diodes. The light emitting sections 122 to 127 denote the iliopsoas muscle 32, musculus rectus femoris 33, lateral vastus muscle 34, musculus gluteus maximus 35, hamstrings 36 and the short head of the short head of biceps femoris muscle 37, respectively. The light emitting sections 122 to 127 are arranged at the locations of the respective muscles.

The light emitting sections 122 to 127 are colored pairwise in three colors. More specifically, the light emitting sections 122 and 125, associated with the mono-articular muscle about the hip joint, are paired together and colored in one tint. The light emitting sections 123, 126, associated with the bi-articular muscle, are also paired together and colored in another tint, whereas the light emitting sections 124 and 127, associated with the mono-articular muscle about the knee joint, are also paired together and colored in still another tint. This pairwise coloration is given only by way of illustration and may optionally be set in any desired manner.

Further, the portion of the skin part 121 that covers up at least the light emitting sections 122 to 127 is formed of a transparent or semi-transparent material so that the lighted states of the light emitting sections 122 to 127 may be visually confirmed from outside. Meanwhile, the coloration of the light emitting sections 122 to 127 maybe by varying the colors emitted by the light emitting elements, such as lamps or light emitting diodes, or by varying the colors of the portions of the skin unit 121 overlying the light emitting sections 122 to 127.

Referring to FIG. 25, the controller of the present embodiment may be the controller of the second embodiment shown in FIG. 16 in which there are additionally provided light emitting driving circuits 130 to 135, as drivers for the light emitting sections 122 to 127. Meanwhile, the light emitting sections 122 to 127 are here assumed to be light emitting diodes.

The light emitting driving circuits 130 to 135 are connected to the light emitting sections 122 to 127, respectively, and turn the light emitting sections 122 to 127 on or off under the instructions from the central processor unit 150.

The controller of the present embodiment may also be the controller of the first embodiment of FIG. 5 in which there are additionally provided the light emitting driving circuits 130 to 135.

The operation of the bi-articular arm device 210 of the present embodiment will now be described. For optionally setting the actuator(s), which are to be in operation, as in the above-described first embodiment, the actuator(s) to be in operation are indicated on the display 200 of the operation terminal, and the light emitting sections, associated with these actuator(s), are turned on in order for the rehabilitator to recognize the actuator(s).

If the rehabilitator has exerted the force in an optional direction, by way of going through the training for rehabilitation, as in the second, fourth and fifth embodiments, the loaded actuators are identified from the direction of force application. The actuator(s) that are in operation are indicated on the display 200 of the operation terminal, while the associated light emitting sections are turned on to have the rehabilitator identify the actuator(s) in operation.

If the actuator(s) to be in operation are set as input in the control block diagram, as in the above-described third embodiment, the so set virtual actuator(s) are indicated on the display 200 of the operation terminal, while the associated light emitting sections are turned on in order for the rehabilitator to identify the actuator(s) which are to be in operation.

Thus, in the present embodiment, the light emitting sections 122 to 127 are provided in register with the muscles of the lower limb of the human body to turn on the light emitting sections associated with the actuator(s) which are in operation or with the actuator(s) which are under load during training for rehabilitation. This allows the rehabilitator to recognize the relationship between the position of the muscles and the direction of force application.

In the above description of the first to sixth embodiments, the lower limb of the human body is taken by way of illustration. However, the present invention may as well be applied to the upper limb because the muscular structure of the upper limb is also composed of the mono-articular muscles and the bi-articular muscles, as is the lower limb.

The entire disclosure of Japanese patent application No. 2007-128009 filed on May 14, 2007, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A robot for training a rehabilitator comprising a bi-articular arm device which includes:
    a first link;
    a second link having a proximal end rotatably supported in a base and having a distal end rotatably connected to a proximal end of said first link;
    a first actuator and a second actuator for generating a driving force for causing said first link to rotate relative to said second link;
    a third actuator and a fourth actuator for generating the driving force for causing said first link to rotate relative to said base;
    a fifth actuator and a sixth actuator for generating the driving force for causing said second link to rotate relative to said base; and
    a skin unit covering up a surface of said first and second links, and a light emitter arranged at a location matched to a mono-articular muscle or a bi-articular muscle of an upper limb or a lower limb,
    said robot further comprising:
    a controller for actuating said first to sixth actuators in accordance with a predetermined driving sequence to generate forces in six directions at the distal end of said first link,
    one or more of said first to sixth actuators, being selected so that the direction of the force to be generated at the distal end of said first link will be the selected direction,
    said light emitter being associated with an actuator generating the driving force or with an actuator subjected to the force.

2. The robot in accordance with claim 1, wherein an initial state is set so that the driving forces generated by said actuators arranged in antagonistic position relationships will be in equilibrium with one another,
    one or more of said actuators being detected which will generate the force of reaction when the rehabilitator has caused the distal end of said first link to be moved in an optional direction,
    one or more muscles associated with said actuator being specified and notified to the rehabilitator.

3. A robot for training a rehabilitator comprising a bi-articular arm device, which includes:
    a first link;
    a second link having a proximal end rotatably supported in a base and having a distal end rotatably connected to a proximal end of said first link;
    a first actuator and a second actuator for generating a driving force for causing said first and second links to rotate independently of each other; and
    a skin unit covering up a surface of said first and second links, and a light emitter arranged at a location matched to a mono-articular muscle or a bi-articular muscle of an upper limb or a lower limb,
    said robot further comprising:

a controller including an algorithm for converting a driving sequence by six actuators, inclusive of said first and second actuators, into another driving sequence by said first and second actuators, said controller allowing the forces in six directions to be generated at the distal end of said first link, one or more of said first to sixth actuators, being selected so that the direction of the force to be generated at the distal end of said first link will be the selected direction, said light emitter being associated with an actuator generating the driving force or with an actuator subjected to the force.

4. The robot in accordance with claim 3, wherein said first and second actuators are controlled so that the torque acting on said first and second actuators when the rehabilitator has exerted the force on the distal end of said first link in an optional direction will coincide with a predetermined target value, the direction of the force acting on the distal end of said first link being calculated from a rotational angle of said first and second actuators and a value of a torque when the torque coincides with the target value, a muscle of an upper or lower limb to which the force has been applied being specified, based on the direction of the force calculated, the rehabilitator being advised of the muscle specified.

5. The robot in accordance with claim 3, further comprising an elastic element for a bi-articular muscle interconnecting said first and second joints, as an inner model, the rotational angle of said first and second actuators being detected when the rehabilitator has exerted the force to the distal end of said first link in an optional direction, said rotational angles being converted into a torque acting on said first and second actuators based on the inner model, a driving voltage or a driving current necessary to generate the torque being applied to said first and second actuators to virtually reproduce the torque by said elastic element of the bi-articular muscle to permit the rehabilitator to physically experience the torque.

* * * * *

UNITED STATES PATENT AND TRADEMARK OFFICE
CERTIFICATE OF CORRECTION

PATENT NO.         : 8,311,671 B2
APPLICATION NO.    : 12/078294
DATED              : November 13, 2012
INVENTOR(S)        : Mamoru Tokita and Koukichi Shimada It is certified that error appears in the above-identified patent and that said Letters Patent is hereby corrected as shown below:

Title Page:
Item (75), should read:

Item (75) Inventors: Mamoru Tokita, Gunma (JP); Koukichi Shimada, Gunma (JP)

Signed and Sealed this
Nineteenth Day of March, 2013

Teresa Stanek Rea
*Acting Director of the United States Patent and Trademark Office*